(12) United States Patent
O'Shea et al.

(10) Patent No.: US 12,231,184 B2
(45) Date of Patent: *Feb. 18, 2025

(54) PROCESSING COMMUNICATIONS SIGNALS USING A MACHINE-LEARNING NETWORK

(71) Applicant: DeepSig Inc., Arlington, VA (US)

(72) Inventors: Timothy James O'Shea, Arlington, VA (US); Nathan West, Washington, DC (US); Johnathan Corgan, San Jose, CA (US)

(73) Assignee: DeepSig Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,798

(22) Filed: Feb. 13, 2023

(65) Prior Publication Data

US 2023/0299862 A1 Sep. 21, 2023

Related U.S. Application Data

(63) Continuation of application No. 17/084,685, filed on Oct. 30, 2020, now Pat. No. 11,581,965, which is a
(Continued)

(51) Int. Cl.
*H04B 17/391* (2015.01)
*G06N 3/047* (2023.01)
(Continued)

(52) U.S. Cl.
CPC ......... *H04B 17/3911* (2015.01); *G06N 3/047* (2023.01); *G06N 3/08* (2013.01);
(Continued)

(58) Field of Classification Search
CPC ............ H04B 17/3911; H04B 17/3912; H04B 17/373; H04L 27/0008; H04L 5/0048;
(Continued)

(56) References Cited

U.S. PATENT DOCUMENTS

| 6,675,145 B1 | 1/2004 | Yehia et al. |
| 10,833,785 B1 | 11/2020 | O'Shea et al. |

(Continued)

FOREIGN PATENT DOCUMENTS

| CN | 109218233 | | 1/2019 | |
| CN | 111478783 A | * | 7/2020 | ........... H04B 17/391 |
| ES | 2300470 T3 | * | 6/2008 | ......... H04L 27/0008 |

OTHER PUBLICATIONS

EP Office Action in European Appln. No. 20795064.3, dated May 2, 2023, 7 pages.
(Continued)

*Primary Examiner* — Rownak Islam
(74) *Attorney, Agent, or Firm* — Fish & Richardson P.C.

(57) ABSTRACT

Methods, systems, and apparatus, including computer programs encoded on computer-storage media, for processing communications signals using a machine-learning network are disclosed. In some implementations, pilot and data information are generated for a data signal. The data signal is generated using a modulator for orthogonal frequency-division multiplexing (OFDM) systems. The data signal is transmitted through a communications channel to obtain modified pilot and data information. The modified pilot and data information are processed using a machine-learning network. A prediction corresponding to the data signal transmitted through the communications channel is obtained from the machine-learning network. The prediction is compared to a set of ground truths and updates, based on a corresponding error term, are applied to the machine-learning network.

29 Claims, 9 Drawing Sheets

Related U.S. Application Data continuation of application No. 16/856,760, filed on Apr. 23, 2020, now Pat. No. 10,833,785.

(60) Provisional application No. 63/005,599, filed on Apr. 6, 2020, provisional application No. 62/837,631, filed on Apr. 23, 2019.

(51) Int. Cl.
*G06N 3/08* (2023.01)
*G06N 20/00* (2019.01)
*H04L 27/00* (2006.01)

(52) U.S. Cl.
CPC ......... *G06N 20/00* (2019.01); *H04B 17/3912* (2015.01); *H04L 27/0008* (2013.01)

(58) Field of Classification Search
CPC ...... H04L 27/2627; G06N 3/047; G06N 3/08; G06N 20/00; G06N 3/045; G06N 3/098; G06N 3/0464
USPC ......................................................... 370/252
See application file for complete search history.

(56) References Cited

U.S. PATENT DOCUMENTS

| | | | |
|---|---|---|---|
| 11,581,965 B2 | 2/2023 | O'Shea et al. | |
| 2001/0055296 A1* | 12/2001 | Akiyama | H04L 27/2647 370/344 |
| 2003/0236662 A1* | 12/2003 | Goodman | G06N 20/00 704/224 |
| 2005/0025040 A1 | 2/2005 | Tang et al. | |
| 2006/0018413 A1 | 1/2006 | Gupta | |
| 2010/0241600 A1 | 9/2010 | Krichevskiy | |
| 2017/0373890 A1* | 12/2017 | Fertonani | H04L 9/40 |
| 2018/0124623 A1 | 5/2018 | Mishra | |
| 2018/0322388 A1 | 11/2018 | O'Shea et al. | |
| 2018/0357643 A1* | 12/2018 | Lee | G06Q 20/425 |
| 2018/0367192 A1 | 12/2018 | O'Shea et al. | |
| 2019/0080237 A1 | 3/2019 | Story et al. | |
| 2020/0005210 A1* | 1/2020 | Nacu, Jr. | G06F 16/24568 |
| 2020/0088862 A1 | 3/2020 | Lundberg et al. | |
| 2020/0104754 A1 | 4/2020 | Veshchikov et al. | |
| 2020/0201313 A1 | 6/2020 | Kludt et al. | |
| 2020/0251006 A1* | 8/2020 | Sharma | G06N 20/00 |
| 2020/0273448 A1* | 8/2020 | Min | G06N 3/044 |
| 2020/0275402 A1* | 8/2020 | Shi | H04W 76/11 |
| 2020/0343985 A1 | 10/2020 | O'Shea et al. | |
| 2021/0091979 A1 | 3/2021 | Ye et al. | |
| 2021/0109242 A1* | 4/2021 | Salman | G01V 1/345 |
| 2021/0119713 A1 | 4/2021 | O'Shea et al. | |
| 2022/0095367 A1* | 3/2022 | Kim | H04W 74/0833 |

OTHER PUBLICATIONS

Extended European Search Report in European Appln No. 20795064.3, dated May 23, 2022, 9 pages.

International Preliminary Report on Patentability in International Appln. No. PCT/US2020/029546, dated Nov. 4, 2021, 10 pages.

PCT International Search Report and Written Opinion in International Appln. No. PCT/US2020/029546, dated Jul. 28, 2020, 11 pages.

Ye et al., "Power of deep learning for channel estimation and signal detection in OFDM systems," IEEE Wireless Communications Letters, Feb. 2018, 7(1):114-117.

EP Office Action in European Appln. No. 20795064.3, dated Jun. 7, 2024, 6 pages.

3GPP TR 38.801 V2.0.0 (Mar. 2017), 3rd Generation Partnership Project; Technical Specification Group Radio Access Network; Study on New Radio Access Technology; Radio Access Architecture and Interfaces, (Release 14), Mar. 2017, 90 pages.

* cited by examiner

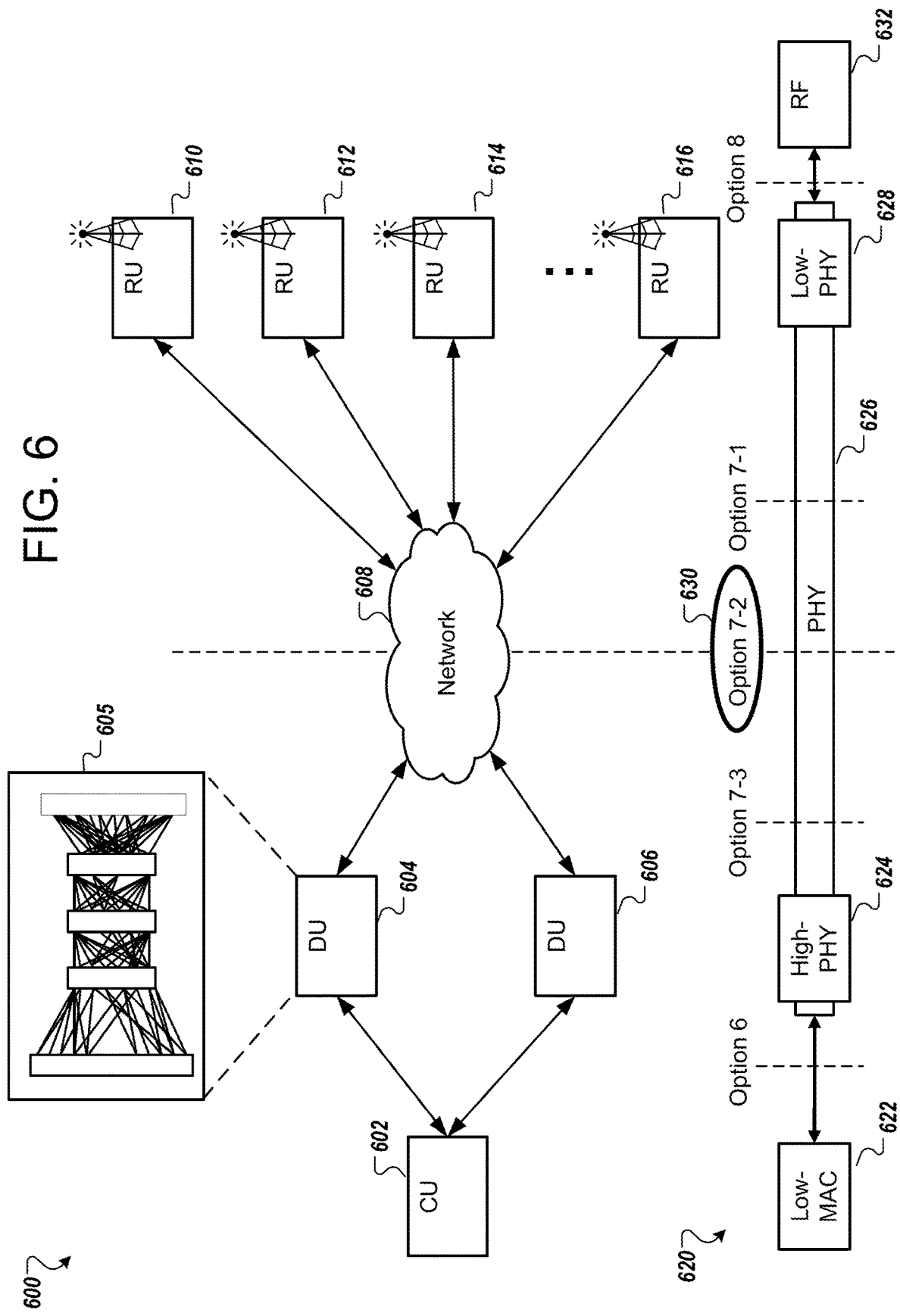

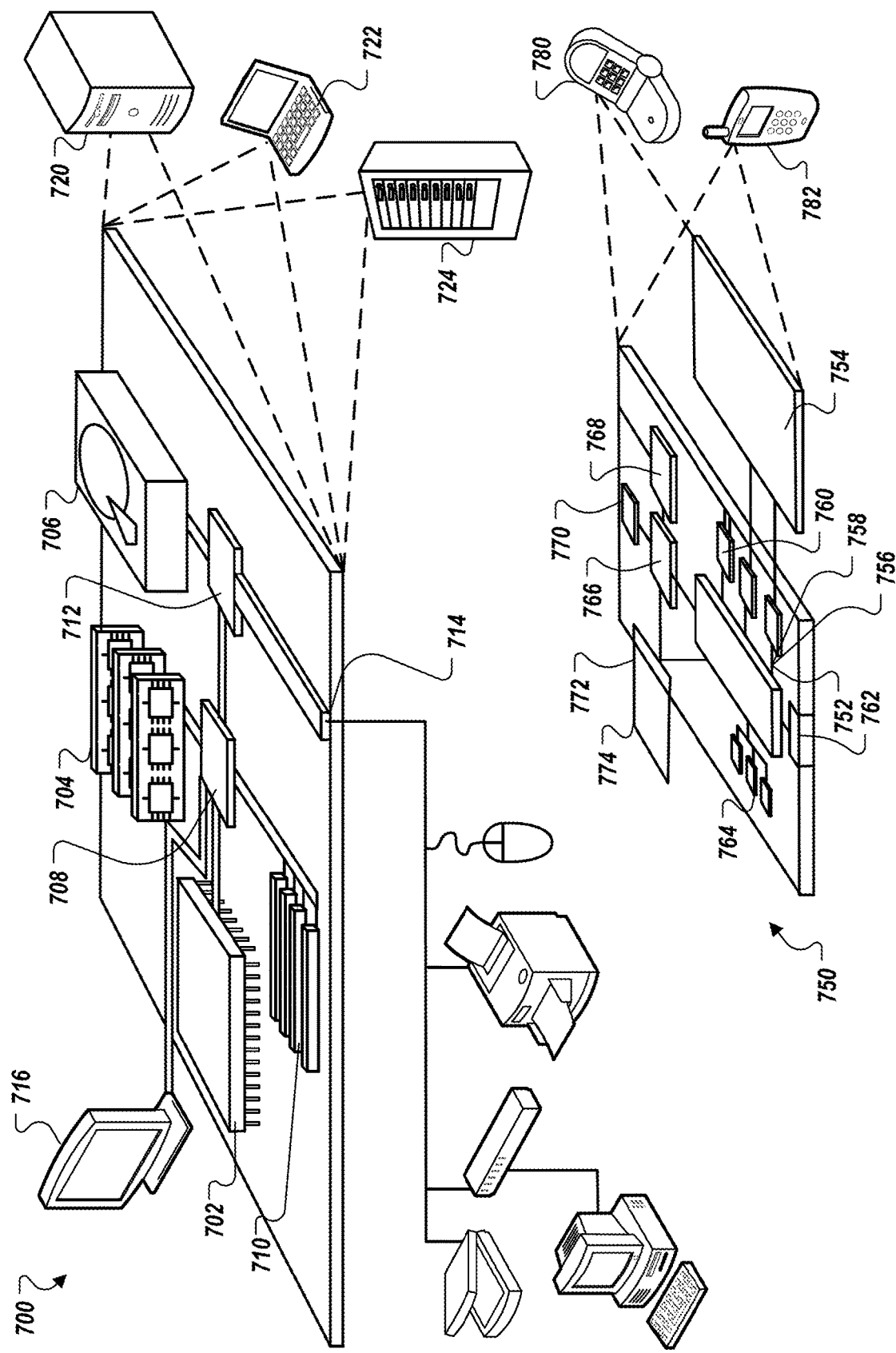

PROCESSING COMMUNICATIONS SIGNALS USING A MACHINE-LEARNING NETWORK

CROSS REFERENCE TO RELATED APPLICATIONS

This application is a continuation of U.S. application Ser. No. 17/084,685 filed on Oct. 30, 2020, now allowed, which is a continuation of U.S. application Ser. No. 16/856,760 filed on Apr. 23, 2020, now U.S. Pat. No. 10,833,785, which claims the benefit of U.S. Provisional Application No. 62/837,631, filed on Apr. 23, 2019, and U.S. Provisional Application No. 63/005,599, filed on Apr. 6, 2020, all of which are incorporated herein by reference.

TECHNICAL FIELD

This specification generally relates to communications systems that use machine learning and includes processing of communications signals using a machine-learning network.

BACKGROUND

Communications systems involve transmitting and receiving various types of communication media, e.g., over the air, through fiber optic cables or metallic cables, under water, or through outer space. In some cases, communications channels use radio frequency (RF) waveforms to transmit information, in which the information is modulated onto one or more carrier waveforms operating at RF frequencies. In other cases, RF waveforms are themselves information, such as outputs of sensors or probes. Information that is carried in RF waveforms, or other communication channels, is typically processed, stored, and/or transported through other forms of communication, such as through an internal system bus in a computer or through local or wide-area networks.

SUMMARY

In general, the subject matter described in this disclosure can be embodied in methods, apparatuses, and systems for training and deploying machine-learning networks to replace elements of processing within a system for communications signals. In some implementations, the communications signals include digital communications signals. By consolidating multiple functions within the transmitter or receiver units into approximate networks trained through an optimization approach with different free parameters, lower bit error rate performance, improved error vector magnitude, frame error rate, enhance bitrates, among other improvements, can be attained over a given communications channel as compared to existing baseline methods conventionally used for digital communications.

In one implementation, a system and method include replacing the tasks of pilot estimation, interpolation, and equalization with a machine-learning network. By consolidating and accomplishing the tasks jointly within an appropriate machine-learning network architecture, lower error rates, lower complexity, or improved user density, among other performance improvements, can be obtained in processing a given data signal compared to today's commonly used approaches such as linear minimum-mean-squared error or minimum-mean-squared error (LMMSE or MMSE).

In other implementations, a machine-learning network approach to processing digital communications can be extended to include several additional signal processing stages that are used in $3^{rd}$ Generation Partnership Project (3GPP), $4^{th}$ generation (4G), $5^{th}$ generation (5G), and other orthogonal frequency-division multiplexing (OFDM) systems, including spatial combining, multiple-input and multiple-output (MIMO) processing as well as beam forming (BF), non-linearity compensation, symbol detection, or precoding weight generation.

In one aspect, a method is performed by at least one processor to train at least one machine-learning network to perform one or more tasks related to the processing of digital information in a communications system. In some cases, the communications channel can be a form of radio frequency (RF) communications channel. The method includes: generating one or more of pilot and data information for a data signal, where one or more elements of the pilot and data information each correspond to a particular time and a particular frequency in a time-frequency spectrum; generating the data signal by modulating the pilot and data information using a modulator for an orthogonal frequency-division multiplexing (OFDM) system; transmitting the data signal through a communications channel to obtain modified pilot and data information; processing the modified pilot and data information using a machine-learning network; in response to the processing using the machine-learning network, obtaining, from the machine-learning network, a prediction corresponding to the data signal transmitted through the communications channel; computing an error term by comparing the prediction to a set of ground truths; and updating the machine-learning network based on the error term.

Implementations may include one or more of the following features. In some implementations, a machine-learning network performs operations corresponding to pilot estimation, interpolation, and equalization. The communications channel may be a simulated channel that includes one or more of an Additive White Gaussian Noise (AWGN) or Rayleigh fading channel model, International Telecommunication Union (ITU) or $3^{rd}$ Generation Partnership Project (3GPP) fading channel models, emulated radio emissions, propagation models, ray tracing within simulated geometry or an environment to produce channel effects, or a machine-learning network trained to approximate measurements over a real channel.

In some implementations, the communications channel includes a real communications channel between a first device and a second device, and where transmitting the data signal through the communications channel includes transmitting the data signal from the first device to the second device and obtaining the modified pilot and data information including a version of the data signal received by the second device.

In some implementations, the pilot and data information includes one or more of pilot subcarriers, data subcarriers, pilot resource elements, or data resource elements.

In some implementations, the prediction obtained from the machine-learning network includes one of a channel response of the communications channel, an inverse channel response of the communication channel, or values of the pilot and data information prior to transmitting the data signal through the communications channel.

In some implementations, the set of ground truths are values of equalized data symbols or channel estimates determined from one or more of a process of generating the pilot and data information, a decision feedback process, pilot subcarriers, or an out-of-band communication.

In some implementations, updating the machine-learning network based on the error term includes determining, based on a loss function, a rate of change of one or more weight values within the machine-learning network; and performing an optimization process using the rate of change to update the one or more weight values within the machine-learning network.

In some implementations, the optimization process includes one or more of gradient descent, stochastic gradient descent (SGD), Adam, RAdam, AdamW, or Lookahead neural network optimization.

In some implementations, the optimization process involves minimizing a loss value between predicted and actual values of subcarriers or channel responses.

In some implementations, the machine-learning network is a fully convolutional neural network or a partially convolutional neural network.

In some implementations, the pilot and data information represents one or more signals transmitted over a communications system corresponding to one or more radio frequencies or one or more distinct radios.

In some implementations, the orthogonal frequency-division multiplexing (OFDM) system includes one or more elements of cyclic-prefix orthogonal frequency division multiplexing (CP-OFDM), single carrier frequency division multiplexing (SCFDM), filter bank multicarrier (FBMC), or elements of other variants of orthogonal frequency-division multiplexing (OFDM).

Implementations of the above techniques include methods, systems, apparatuses and computer program products. One such system includes one or more processors, and memory storing instructions that, when executed, cause the one or more processors to perform some or all of the above-described operations. Particular implementations of the system include one or more user equipment (UE) or base stations, or both, that are configured to perform some or all of the above-described operations. One such computer program product is suitably embodied in one or more non-transitory machine-readable media that stores instructions executable by one or more processors. The instructions are configured to cause the one or more processors to perform some or all of the above-described operations.

Advantageous implementations can include using a machine-learning network approach to scale a system from a small number of transmit or receive antennas to massive multiple input, multiple output (MIMO) systems with a large number of antenna elements, e.g., 32, 64, 128, 256, 512, 1024, or more. The machine-learning network approach can scale close to linearly while alternative, conventional approaches, including linear minimum-mean-squared error (LMMSE) or linear zero-forcing (ZF) approaches to estimation, equalization, and pre-coding matrix calculation, often involve algorithms with higher order such as $O(N^3)$ (where N is an integer >0) or exponential complexity as the number of users (e.g., mobile user equipment terminals) or the number of antennas increases. The machine-learning network approach discussed in this specification reduces the complexity of systems, for example systems with relatively large numbers of elements, compared to conventional approaches, while offering improved performance to enhance current day wireless standards and to be used in future wireless standards, such as 3GPP $6^{th}$ Generation (6G) cellular networks or future Wi-Fi standards, among others.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 6 is a diagram showing a front-haul scenario of a communications system.

FIG. 7 is a diagram illustrating an example of a computing system used for processing digital communications using a machine-learning network.

Like reference numbers and designations in the various drawings indicate like elements.

DETAILED DESCRIPTION

Figure 1:
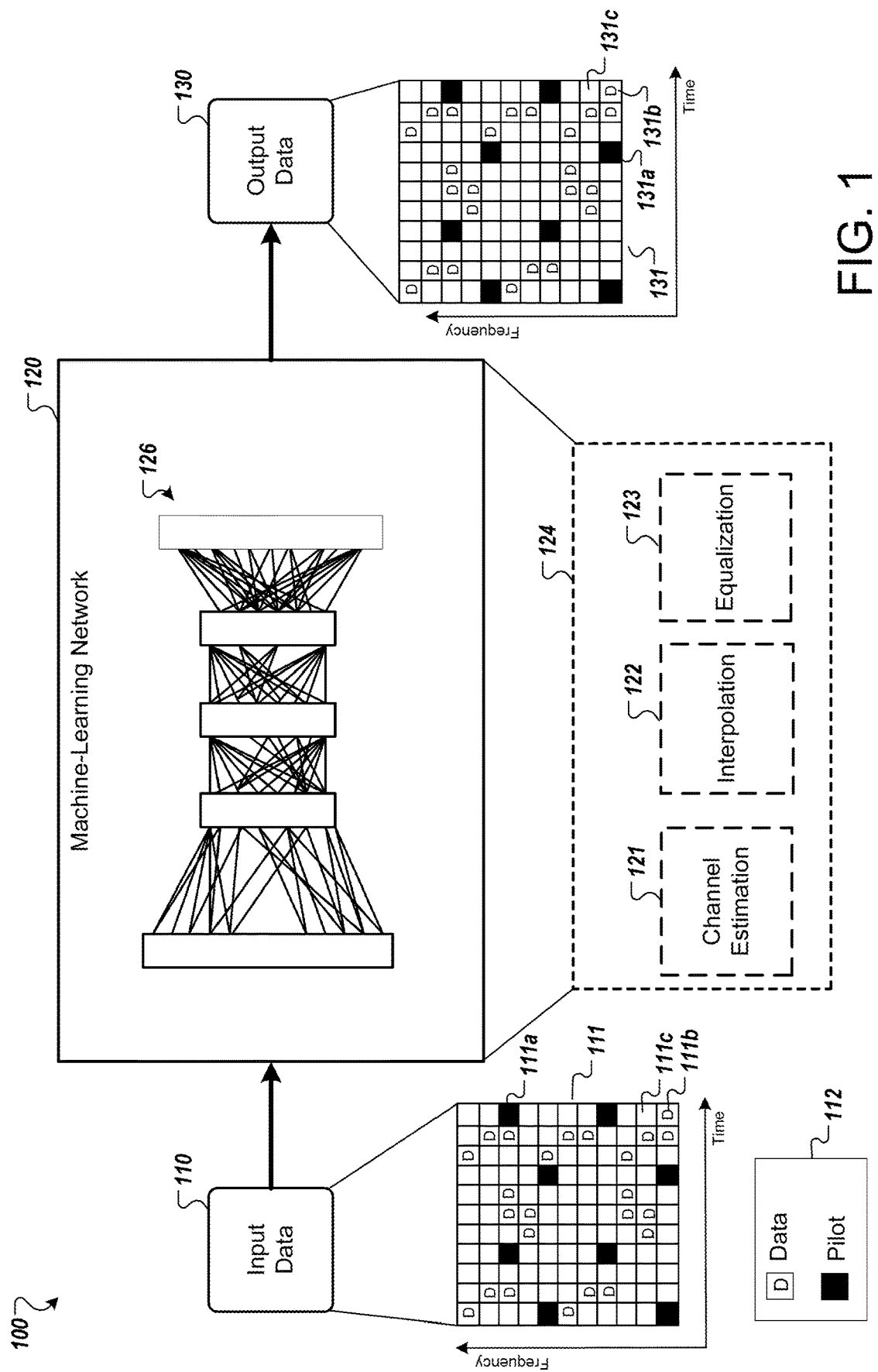
FIG. 1 is a diagram showing an example of a system for processing digital communications using a machine-learning network.

The disclosed implementations present techniques for processing communications signals using a machine-learning network. Using the disclosed techniques, multiple processing stages involved in digital communications can be adapted and consolidated into approximate networks within a machine-learning network trained through an optimization approach with different free parameters. The machine-learning network approach to processing digital communications enable a lower bit error rate performance over the same communications channel as compared to existing baseline methods. For example, in conventional radio receivers, estimation, interpolation, and equalization may be performed using existing baseline methods such as minimum-mean-squared error (MMSE), linear interpolation, or various others. In this scenario, as well as others, a machine-learning network can be used to perform the same tasks as the existing baseline methods with improved performance metrics such as bit error rate (BER) and error vector magnitude (EVM) among others. In addition, the machine-learning networks or approximate networks can often be run on more concurrent and more energy efficient hardware, such as systolic array or similar classes of processors grids. The networks can also run at lower precision, such as float16, int8, int4, or others, rather than float32 precision of conventional systems. The networks can be further enhanced, in terms of efficiency or performance, through the inclusion of additional techniques such as radio transformer networks and neural architecture search, or networking pruning, among several other techniques, which reduce the computational complexity of a specific task or approximate signal processing function through modifications to the processing network or graph.

In this context, digital communications includes OFDM radio signals, OFDM variant signals (e.g., cyclic-prefix OFDM (CP-OFDM)), 4th generation (4G) Long Term Evolution (LTE) communication signals, 5G communication signals including 5G new radio (5G-NR) physical (PHY) channel signals and other similar 3GPP radio access network (RAN)-like signals (e.g., beyond-5G and 6G candidates). Digital communications can also include RF signals in Wi-Fi communications networks, e.g., wireless networks using IEEE 802.11 protocols, or a plurality of additional internet of things (IoT) or other wireless standards.

In some implementations, the machine-learning network approach is applied in non-OFDM systems. For example, the machine-learning network approach can be used within the context of radar systems. Radar systems with multi-antenna processing for channel estimation, target estimation, or spatial estimation are currently challenged by the high complexity and model deficit features of conventional methods such as LMMSE, among others, for estimation used today in many systems. Within such non-OFDM systems, a machine-learning network approach offers improvements in efficiency as well as improvements in performance over conventionally used methods.

In some implementations, a system for processing digital communications as described in this specification uses a machine-learning network to perform one or more tasks for transmitting or receiving, or both, RF signals. In some cases, these tasks include pilot estimation, interpolation, and equalization. Some implementations include additional tasks performed using a machine-learning network, such as spatial combining, beam-forming (BF), non-linearity compensation, symbol detection, pre-coding weight generation, or other signal processing stages used in 5G and other orthogonal frequency-division multiplexing (OFDM) systems.

In some implementations, a machine-learning network encompasses other aspects. For example, a machine-learning network can encompass aspects such as error correction decoding, source and/or channel coding or decoding, or synchronization or other signal compensation or transformation functions. The machine-learning network can be trained before deployment, after deployment using one or more communications channels, or a combination of the two (e.g., trained before deployment and updated after deployment). In some implementations, training includes training one or more aspects of a machine-learning network before deployment and further training the one or more aspects, or other aspects, after deployment. For example, a model and architecture of a machine-learning network can be trained and optimized offline before deployment to create a starting condition. After deployment, the machine-learning network can be further optimized from the starting condition to improve based on one or more operating conditions. In some cases, the one or more operating conditions can include effects of a communications channel.

In conventional communications systems, processing for digital communications can take place in stages. For example, a number of systems use multi-carrier signal modulation schemes, such as OFDM, to transmit information. Some of the time-frequency subcarriers within an OFDM grid can be allocated as reference tones or pilot signals. Pilot signals can be resource elements with known values; these can be referred to as pilot resource elements. Other resource elements within the OFDM grid can carry data; these can be referred to as data resource elements. In some cases, other multiple access schemes may be used including variations that employ similar allocations of resources compared to OFDM. Variations, such as SCFDMA, CP-OFDM, WPM, or other basis functions can also be used. The data resource elements, or data subcarriers, can be used to carry modulated information bits. By properly allocating subcarrier width and length such that flat fading may be assumed for a single slot, that is, coherence time and frequency over one subcarrier, equalization may be performed through complex multiplication of a channel inverse tap with each subcarrier value.

A sparse set of channel response values for each subcarrier between the known pilot signals can be estimated by applying a method of equalization (e.g., zero-forcing (ZF) or minimum-mean squared error (MMSE), among other methods) and then applying a method of interpolation (e.g., a linear interpolation, spline interpolation, Fast Fourier Transform (FFT) interpolation, sinc interpolation, or Wiener filtering, among other interpolation methods). In some cases, the sparse set of channel response values can be estimated by using data from a given signal or other signals received in a data-aided way. The channel inverse taps may then be applied in an equalization step that multiplies the inverse channel response with the full set of subcarriers to estimate the transmitted values prior to modification. In some cases, estimation of the channel can occur without relying on the transmitted data. For example, instead of known values, properties of the modulation, such as constant modulus algorithm equalizers (CMA), among others, can be used to estimate the channel. In some cases, modification of transmitted values can be obtained from output of a fading channel. The equalization, interpolation or estimation above, among other tasks, are performed in conventional communications systems in different stages using separate models, for example, using separate hardware or software routines, or both. In some cases, specific algorithms are developed and implemented within this process. For example, algorithms for interferer cancellation or nulling explicitly within the estimated or received signals can be developed and implemented.

The disclosed implementations for processing digital communications using a machine-learning network can replace the separate stages used on conventional systems for applications such as OFDM signal transmission and processing. In some implementations, the machine-learning network does not use separate models for estimation, interpolation, or equalization, but instead jointly learns for these tasks using real data. By adopting an end-to-end learning approach to replace or supplement processing steps conventionally performed in stages, the disclosed implementations enable improved performance while reducing complexity and lowering cost of operation, for example, lower power consumption.

In some implementations, the machine-learning network enhances the reception of radio signals, e.g., OFDM signals or other communication signals, by leveraging learned relationships within the machine-learning network used for processing. For example, learned solutions can exploit features of both data-aided and non-data aided equalizers in the learned solutions, exploiting both known pilot values and distributions of certain unknown-data modulations in solutions. Similar solutions would be comparatively challenging to accomplish in a closed form statistical approach. In addition, the systems can perform learning enhanced schemes which take into account common phenomena, such as interferers, distortion or other effects. These phenomena would, in a conventional approach, require special algorithms or logic within estimation stages, such as cancelling narrowband tones or bursts, among others, which could negatively impact (e.g., destroy) pilots and interpolation steps using the conventional statistical approach. In contrast, the machine-learning approach is able to use both known pilot values and distribution of certain unknown-data modulations to determine solutions.

Using the disclosed techniques, systems such as OFDM, 4G, 5G-NR, 5G+, CP-OFDM, Single-carrier frequency division multiple access (SC-FDMA), filter-bank multicarrier (FBMC), Discrete Fourier Transform-spread-OFDM (DFT-s-OFDM), among others, can be enhanced. The disclosed techniques also enable such systems to be incrementally expanded, in which a greater share of the signal processing functions are replaced by jointly learned machine learning approximations, which perform better and reduce complexity compared to presently deployed systems. The incremental expansion includes expanding more of the reception and transmission processes as improvements are demonstrated in each process, justifying the changes. In some implementations, the process is driven by existing deficiencies in a given approach. For example, statistical models for a channel typically can have a degree of inaccuracy in a real system. In some cases, the degree of inaccuracy in a given system can be used to expand the use of a machine-learning network approach to portions of the given system involved in the inaccuracy. In existing systems, the estimation and equalization as well as spatial processing stages can often be core aspects, in which the disclosed techniques for data-driven learning can enhance performance over naïve assumptions often made in conventional approaches involving linear processing and system modeling.

The process of incremental expansion (e.g., of the processing stages incorporated in the machine-learning network or approximation network) can follow evolutions in the parameters or signal processing functions (e.g., changes to modulation, coding, error correction, among others) for RF signal waveforms for 3GPP communications signals, such that incremental changes in the system can occur to improve performance. These incremental changes, such as transmitter adaptation of shaping, modulation, or pre-coding, may occur as feedback mechanisms within a system including a machine-learning network (e.g., where the channel estimation can be exploited or transformed to improve or implement these functions). The feedback mechanisms can involve channel state information feedback or compressed forms of channel state information being processed by the machine-learning network of a communications system, or elements of another communications system communicably connected to the machine-learning network. In some instances, feedback mechanisms may implement protocols such as channel state information reference signal (CSI-RS) in 5G-NR systems, which transmit signal quality or other CSI data over the RAN protocol in a wireless system. Feedback mechanisms may also include weight or parameter modifications to improve the performance of one or more machine-learning networks within one or more of the communications systems, or the conveyance of error statistics such as error vectors, error magnitudes, bit error or frame error information, among others.

The tasks performed by a machine-learning network as disclosed in this specification can increase over time. For example, feedback of other processing data related to a communications channel or communications sent over a communications channel, can be used by a machine-learning network within a given communications system to increase the capability of the machine-learning network to perform one or more additional tasks, or increase the amount of communications processed by the machine-learning network. For example, certain cell deployments, geometries, features, patterns of life, or information traffic may lend themselves over time to specific sets of network weights or estimation stages or other signal processing stage approximations. Performance of the machine-learning network approach can be enhanced by leveraging this information in the form of past feedback data.

In some implementations, data from communications processed by one or more machine-learning networks is used to inform the modifying of weights or parameters of at least one of the one or more machine-learning networks. For example, one or more machine-learning networks within a shared system or otherwise communicably connected can transmit data on one or more previously processed signals. The data from the one or more previously processed signals can be used by a member of the one or more machine-learning networks, or a device controlling the member of the one or more machine-learning network, to modify weights or parameters within the member to take advantage of the data captured by the one or more machine-learning networks. In some cases, the data on one or more previously processed signals can be information related to a fade of a signal across a communications channel. In some cases, the data from one or more communication systems may be used to build models or approximations of behaviors across one or more cells. For instance, radios experiencing similar forms of interference, fading, or other channel effects may be aggregated to build approximate signal processing functions which perform well across that class of effect, or to build approximate models in order to simulate the channel effects experienced by those radios.

In the following sections, the disclosed techniques are described primarily with respect to cellular communications networks, e.g., 3GPP 5G-NR cellular systems. However, the disclosed techniques are also applicable to other systems as noted above, including, for example, 4G LTE, 6G, or Wi-Fi networks. These techniques are further applicable to other domains. For example, the disclosed techniques can be applied to optical signal processing where high rate fiber optic or other systems may seek to perform signal processing functions at high bit rates and with low error rates while maximizing performance. The disclosed techniques using the machine-learning network approach can be used to achieve improved performance while being able to handle hard to model impairments.

FIG. 1 is a diagram showing an example of a system 100 for processing digital communications using a machine-learning network. The system 100 includes input data 110 fed into a machine-learning network 120 that produces output data 130. The machine-learning network 120 can perform tasks such as channel estimation, interpolation, and equalization, replacing separate components for performing these tasks that are used in deployed present day systems, for example, components for channel estimation 121, interpolation 122 and equalization 123 that would be used in a present day processing stage group 124. As discussed above, other tasks performed in transmitting or processing a signal can also be a part of the machine-learning network 120. The example system 100, and the tasks in which the machine-learning network 120 performs, is not meant to limit the scope of the present disclosure. Implementations of systems with additional tasks replaced by a machine-learning network are discussed later in this disclosure, for example in reference to FIG. 5 and corresponding description.

In some implementations, the input data 110 is an OFDM or CP-OFDM signal (e.g., in the 3GPP 5G-NR uplink (UL) or downlink (DL) PHY), as shown graphically as an input plot 111 that is a time-frequency spectrum grid of pilot and data subcarriers and time slots within an OFDM signal block. Each grid element in the input plot 111 is referred to as a tile, e.g., tiles 111a and 111b. The tiles 111a and 111b represent a pilot subcarrier and data subcarrier, respectively. A legend 112 describes the visual symbols that denote a pilot subcarrier and a data subcarrier used in the example of FIG. 1. The visual symbols as shown in the legend 112 are for illustration purposes only. Although the tile 111a is a pilot subcarrier and the tile 111b is a data subcarrier, both the tiles 111a and 111b are resource elements or subcarriers that carry information over a communications channel. The input plot 111 can also be referred to as an unequalized resource grid that includes tiles. The subcarriers carry pilot (reference) signals or tones in pilot tiles, and data signals or tones in data tiles. The pilot tiles include filled-in tiles with the letter "P", e.g., tile 111a. The data tiles are shown as non-filled-in tiles with the letter "D", e.g., tile 111b. Unoccupied tiles not denoting pilot or data subcarriers are shown as non-filled-in tiles without any letter, e.g., tile 111c. In some cases, all tiles within the input plot 111 are occupied, e.g., with pilot or data subcarriers, or both.

In some implementations, pilot and data information, such as pilot and data subcarriers, or other resource elements, are transmitted. In other implementations, only pilot information or only data information are transmitted and a non-data-aided learned approach can be used. In some cases, subcarriers change between pilot and data information elements several times over a given slot. In this context, pilot and data information refers to pilot subcarriers, data subcarriers, pilot resource elements, or data resource elements, or any combination of these.

In some implementations, inputs into the machine-learning network 120 include other items. For example, masks can be sent as input into the machine-learning network 120. The masks can indicate to the machine-learning network 120 which resource elements are pilots, which are data, and in some cases, which elements are from different users or allocations, or what is any of the known values or modulation types of each element. In other implementations, inputs into the machine-learning network 120 may not take the form of such a single or multi-layer OFDM grid but may take the form of raw time-series sample data which may or may not be synchronized depending on which approximation stages and transforms are learned.

In 3GPP cellular networks, the pilot tiles are populated using primary and secondary synchronization signals or other protocol information such as uplink directives to UEs as well as other signals that may be computed or predicted from cell information, such as cell identification (ID), physical cell ID, or other transmitter state information. Data tiles typically carry symbol values corresponding to the information transmitted. In some cases, the symbol values of one or more data tiles may be unknown. The symbol values may be unknown, however, the modulation and set of possible discrete constellation points and layout in resource elements may be known (e.g., MCS or FRC assigned to the burst).

During a typical OFDM reception process, pilot tiles are used to estimate the communications channel response (e.g., by using a MMSE or zero forcing (ZF) algorithm to perform estimation) for each time-frequency tile. The estimates for pilot tiles may then be interpolated across data tiles to obtain estimates for the data tiles as well. Finally, estimated channel values may be divided from the received symbol values (or typically multiplied with the channel inverse), to receive estimates for the transmitted tiles (which include both pilot tiles and data tiles). However, in general, the task is to obtain an accurate estimate of the correct transmitted symbol values, given the received pilot tiles and data tiles that may be sparse or irregularly spaced over the received time-frequency grid, and where the positions of the transmitted pilot tiles within the OFDM signal block are known and the positions of the transmitted data tiles are partially unknown. For example, the system 100 may know what constellation was transmitted, or some probability distribution over the possible values, but the system does not know, with certainty, the values of data tiles transmitted. If the exact value transmitted is known, that transmitted value would be a reference tone.

In contrast to the conventional approach of breaking the reception process into separate channel estimation 121, interpolation 122, and equalization 123 stages, the system 100 uses machine-learning network 120 to leverage end-to-end learning. The machine-learning network 120 learns a compact joint estimator that approximates the transmitted values directly from the sparse grid of received values, such as the input data 110, to produce estimates of the channel or transmitted symbols, such as the output data 130.

The machine-learning network 120 learns to accomplish these tasks jointly and, in doing so, learns to compensate for channel effects and to interpolate the channel response estimate properly across a sparse grid, in some cases leveraging both data aided (e.g., reference) and non-data aided (e.g., non-reference) resource elements. Channel estimation, interpolation, and equalization now performed collectively by the machine-learning network 120, which can enable a more accurate match of underlying propagation phenomena received in one or more signals such as the output data 130.

In some implementations, the machine-learning network 120 uses structured information within the channel response (e.g., deterministic, known, high probability behaviors, structure or geometry leading to stabilities or simplifications in the estimation and interpolation tasks, among others). Using the structured information within the channel response enables the machine-learning network 120 to improve on conventional approaches of performing channel estimation 121, interpolation 122, and equalization 123 with separate stages or models. The machine-learning network 120 is able to provide significant performance improvements over the conventional approach. Some of the performance improvements are described in greater detail below with respect to FIGS. 2B and 2C.

In some implementations, tiles for multiple layers may be received. For example, time-frequency tiles for multiple layers may be received from different antennas, antenna combines or spatial modes. An estimation task, such as the channel estimation, may then consume multiple input values such as a three-dimensional (3D) array over time, frequency and space. From at least the multiple input values, estimated transmit symbols or channel estimates for an arbitrary number of information channels such as one or more information input streams to a multiple input, multiple output (MIMO) system or code can be produced and transmitted across one or more communications channels. While this generally considers "digital combining", in some implementations, analog-digital combining schemes such as millimeter wave (mmWave) networks are also addressed by the disclosed techniques. For example, the machine-learning network approach may be applied by adapting and pushing weights down to analog combining components on an antenna combining network or array calibration network or set of weights.

In some implementations, the machine-learning network 120 is implemented as a plurality of fully connected layers as shown graphically in item 126. The illustrated layers of the graphical representation 126 are meant to convey two or more layers of the machine-learning network 120 and not all layers or aspects of the machine-learning network 120.

In some implementations, the machine-learning network 120 is a convolutional neural network, or another form of neural network. Different alternative implementations are discussed later in this specification.

The machine-learning network 120 processes the input data 110, to produce the output data 130. Where the input data 110, in the example of FIG. 1, is a collection of unequalized resource elements or subcarriers, the output data 130 is a collection of equalized resource elements or subcarriers, which is shown as the output plot 131. In some cases, for the equalized resource elements, the complex value of each grid element in the output data 130 closely resembles the values transmitted prior to transmission over the channel, having removed random phase and amplitude changes, or the addition of other interference or channel effects on these elements, which can be present in the unequalized grid. The output data 130 represents an estimation of a received signal depicted as the input data 111. As discussed later in this specification, the equalized collection of resource elements or subcarriers can be used in further processes involved in transmission or reception of communications signals. In some cases, the output data 130 of the machine-learning network 120 may be a grid of channel inverse taps, —which is multiplied with the input data 110 to attain a good estimate of the originally transmitted OFDM symbol grid. In some cases, the information in the output data 130 may represent soft-log-likelihoods of bits, hard bits, or decoded codewords in the originally transmitted information. In some cases, the output data 130 may correspond to specific grid regions or allocations, but may not take the form of a specific OFDM grid in all instances.

In some cases, the machine-leaning network 120 can run alongside other similar calculations within a system. For example, in the system 100, conventional stages for channel estimation 121, interpolation 122, and equalization 123 can be performed together with processes corresponding to the machine-learning network 120. In some cases, calculations by the conventional stages can be used to determine one or more comparison values between the conventional approach and the machine-learning network techniques. In some cases, calculations by conventional stages can be used to help train the machine-learning network 120. In some cases, a system variable (e.g., a received signal strength indicator (RSSI) or metrics of CSI stability), or other parameter or notification, can enable the use of the machine-learning network approach over the conventional approach, or vice versa. For example, in a small communications network that does not experience much data traffic or does not have a currently functioning machine-learning network code base or hardware to perform the machine-learning network approach, the conventional approach can be used. In some cases, a threshold number of communications or signals received or a performance metric related to the performance of the conventional or the learned approximation network can trigger the use of one approach over the other. For example, when larger antenna arrays, such as a 64-element antenna array, is in use for transmission or reception within a communications system (e.g., in massive MIMO cellular networks) or the EVM or FER of a learned estimation network outperforms the EVM or FER of a conventional approach, this can be a trigger to use the machine-learning network approach.

Figure 2A:
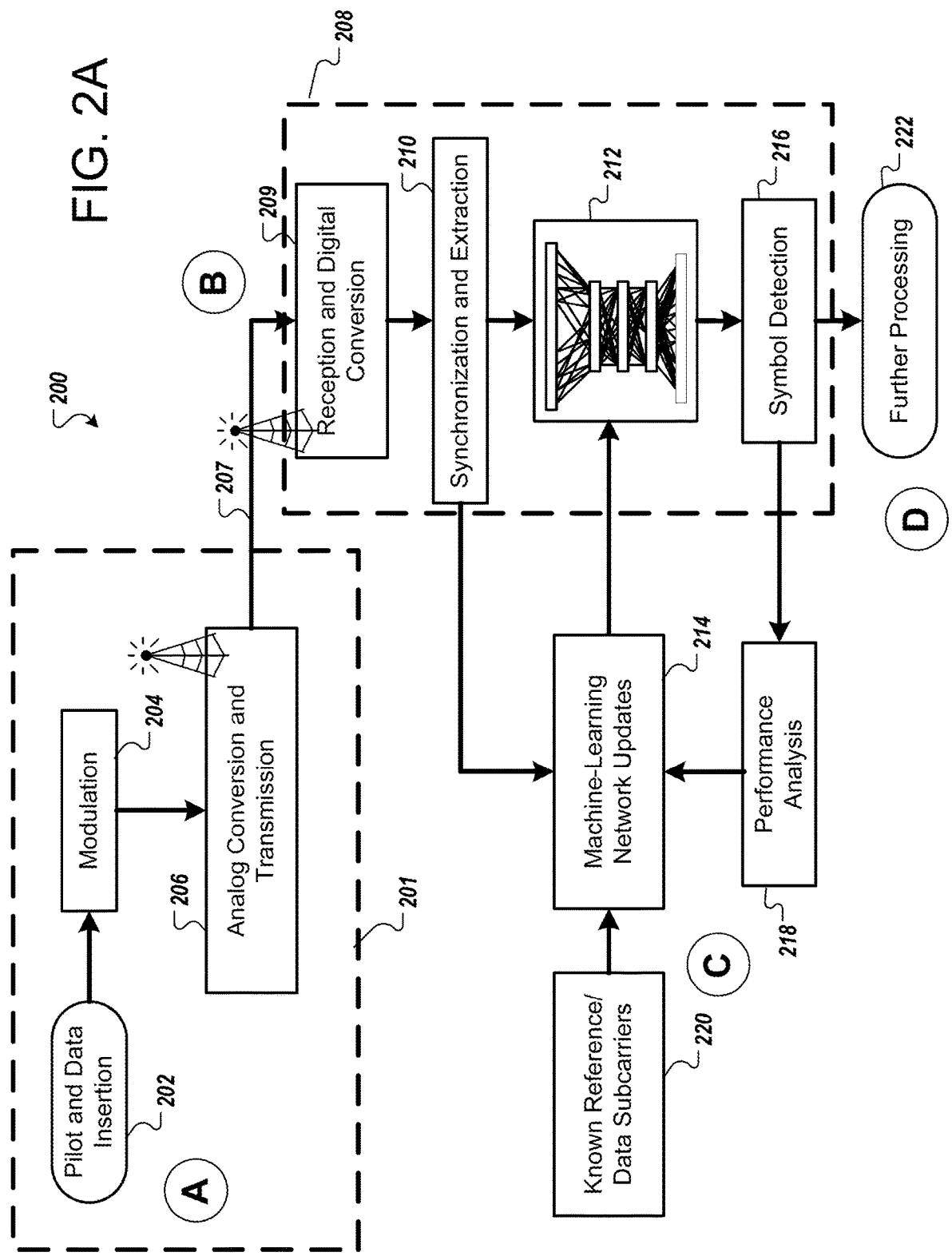
FIG. 2A is a diagram showing an example of a system for training a machine-learning network for processing digital communications.

The machine-learning network 120 is trained to receive input data, such as the input data 110, and produce output data, such as the output data 130. FIG. 2A is a diagram showing an example of a system 200 for training a machine-learning network 212 for processing digital communications between devices 201 and 208. In some implementations, the machine-learning network 212 is similar to the machine-learning network 120 of FIG. 1. However, the machine-learning network 212 can also be different than the machine-learning network 120 in other implementations.

The machine-learning network 212 is trained or deployed, or both, over one or more communications channels 207, or approximations of a communications channel, which can be, for example, a 5G-NR wireless communications channel for transmitting or receiving data in a cellular network. In some cases, the system 200 is used after deployment of the machine-learning network 212. The illustration of FIG. 2A shows device 201 transmitting signals to device 208, and system 200. The machine-learning network 212 is employed in the receiving device 208 to detect or estimate properties of a transmitted signal. However, in other cases, the device 201 may receive signals from the device 208; in such cases, a similar machine-learning network could be used in the device 201. In some implementations, the device 201 or the device 208 is a mobile device, such as a cellular phone, a tablet or a notebook, while the other device is a network base station.

The operations of the system 200 are shown in stages A to D in one example process of training the machine-learning network 212. Stage A shows pilot and data insertion 202 for a given data signal that is to be transmitted from the transmission device 201 to the receiving device 208. The pilot and data information is then modulated using a modulation process 204. In some implementations, the pilot and data information is modulated using a multi-carrier transmission scheme such as OFDM. In some cases, a 5G-NR test signal modulator is alternatively used for modulating the pilot and data information. The modulated information is then converted to analog form for transmission using a converter 206 (e.g., a digital to analog converter (DAC)). The analog information is then transmitted as an RF signal over the communications channel 207 to the receiving device 208. The analog information may pass through various RF components such as amplifiers, filters, attenuators, or other components which effect the signal.

Stage B shows the analog RF signal sent over the communications channel 207 received by the receiving device 208, which may pass through a number of analog RF components and then converts the received signal to a digital signal using a converter 209 (e.g., an analog to digital converter (ADC)). In the example of FIG. 2A, existing methods of transmitting and receiving analog signals from a transmitted device to a reception device can be used. The converted digital information is then synchronized and subcarriers are extracted using a synchronization and extraction process 210. In some cases, synchronization stages or additional linearity compensation stages may also be performed by machine learning networks. The subcarriers in this case are a form of unequalized resource grid within a frequency-time spectrum over one or more layers or antennas. The subcarriers are processed by the machine-learning network 212. In this example, the subcarriers are also sent to a machine-learning network update component 214, to be used for training the machine-learning network 212, as described below with respect to stage C of FIG. 2A.

In some implementations, the machine-learning network 212 is a neural network that performs a set of parametric algebraic operations on an input vector to produce an output. The machine-learning network 212 includes several fully connected layers (FC), with a layer performing matrix multiplications of an input vector with a weight vector followed by summation to produce an output vector. In some implementations, the machine-learning network 212 includes non-linearity, such as a rectified linear unit (ReLU), sigmoid, parametric rectified linear unit (PReLU), MISH neural activation function, SWISH activation function, or other non-linearity. In some cases, the machine-learning network 212 leverages convolutional layers, skip connections, transformer layers, recurrent layers, residual layers, upsampling or downsampling layers, or a number of other techniques that serve to improve the performance of the machine-learning network 212, for example by achieving an improved performance architecture. In some implementations, the machine-learning network 212 is a convolutional neural network. In some cases this takes the form of a backbone network, u-Net, or other similar network that incorporates appropriate transformers, invariances, or efficient layers, which improve performance while reducing computational complexity.

In some instances, complex valued multiplication in layers of the machine-learning network 212, including FC layers or convolutional layers is used to aid in training the system 200 by training the machine-learning network 212. In some implementations, the machine-learning network 212 includes multiplying pairs of complex weights with pairs of complex inputs to mirror complex valued multiplication tasks that are performed in complex analytic form (e.g., outputs (y0,y1)=(x0*w0−x1*w1), (x0*w1+x1*w0)). In this way, complex layers can sometimes reduce the parametric complexity and overfitting of the network, resulting in faster training and lower computational, training, and data complexity of the result.

In some implementations, by conducting a forward pass through the set of operations performed by the machine-learning network 212, a prediction is made of the output values, which may be a prediction of the channel response of the communications channel 207, the inverse channel response of the channel 207, the tile values of the RF signal prior to transmission, or related values (e.g., transmitted codewords or bits, among others). The related values can be used to calculate the channel response of the channel 207, the inverse channel response of the channel 207, or the tile values of the RF signal prior to transmission. In some cases, the channel response or the inverse channel response of the channel 207 is predicted per-tile from within a resource grid of signals within a frequency-time spectrum, such as the resource grid shown by input plot 111 of FIG. 1.

The device 208 uses the output prediction from the machine-learning network 212 for detecting symbols, using symbol detection component 216, where the detected symbols are estimates of the symbols transmitted from the device 201, using the prediction output by the machine-learning network 212. The detected symbols are used in performance analysis 218.

Stage C in FIG. 2A shows data from the synchronization and extraction 210 and data from the symbol detection 216 are used to obtain machine-learning network updates 214 for the machine-learning network 212. The machine-learning network updates 214 computes a loss function, which measures a distance (e.g., a difference) between the known reference or data subcarriers 220 and the estimates of the transmitted symbols obtained from symbol detection 216. In some cases, this loss or difference may also consist of a maximum of an L1 loss or scaled L1 loss, and an L2 loss or scaled L2 loss, combining multiple distance metrics to exploit the best properties of both L1 and L2 loss convergence in their differing performance regions. This process may be referred to as the changeover value in denominator loss, or the constellation value inverse decay loss. In some cases, a rate of change of the loss function is used to update one or more weights or parameters within the machine-learning network 212. Actual transmitted symbol values used for computing the loss function are determined from known transmissions, in which the known reference and data subcarriers 220 can be pre-determined. For example, in some cases known or repeated data is transmitted over the air which enables predicting data values. In some cases test sequences, such as pseudo random bit sequences (PRBS), may be transmitted such that both the transmitter and receiver are able to compute the same bits or symbol values at either end of the link error free. In some implementations, such sounding or known-data training operations are realized in simulation or link sounding scenarios or within excess cell capacity.

In some implementations, the known reference and data subcarriers 220 come from a different source. For example, demodulation or decoding, either through conventional statistical methods such as MMSE or believe propagation, can estimate the most likely bits, symbols, or values seen based on values in the received signal, with some degree of error correction or fault tolerance. Furthermore, estimation of the symbols or bits can occur within the machine learning network as well. Whether by the conventional or MMSE approach or through the machine learning network, bits, codewords, or other information, can be estimated. This estimation is performed, in some cases, with a given error correction capability, such as within the Polar or low-density parity-check (LDPC) block code decoders used within the 5G-NR standard, and either cyclic redundancy checks (CRC) or simply forward error correction (FEC) codeword check bits such as in LDPC, providing a rapid indication about the reception of the information, for example whether all of the bits in a codeword have been received correctly. Upon knowledge of a correct frame (e.g., the checksum passes, LDPC check bits are correct), bits can be re-modulated to provide ground truth symbol values, correct bits, or log-likelihood ratios can be computed from the received and ground truth symbol locations or channel estimates. These ground truth symbol values, correct bits, or log-likelihood ratios, among others, can be used within the distance metric in order to update the machine learning model and its weights.

As another example, known reference or data subcarriers can come from out-of-band coordination from other user equipment (UE), next generation nodeB (gNB) or other base stations, network elements, or prior knowledge of content. In some cases, application data or probabilistic information on one or more of these items can be used to infer transmitted symbols. The known reference or data subcarriers 220 obtained by the system 200 can be stored in a form of digital data storage communicably connected to an element for obtaining the machine-learning network updates 214 for the machine-learning network 212.

Model updates calculated in the system 200 by elements such as the machine-learning network updates 214 allow model predictions to improve over time and iteratively provide improved estimates of the transmitted symbol values upon training in representative channel conditions. In some implementations, baseline models are used to provide estimation. In other implementations, the machine-learning network 212 is used to provide estimations with a form of error feedback to enable iterative training.

Training the machine-learning network 212 can take place using one or more received input signals as input data for the machine-learning network 212. In some implementations, given input data is used for two or more iterations and the machine-learning network 212 learns to model particular parameters or weights based on the given input data. In other implementations, new data is used for each iteration of training. In some cases, data used for training the machine-learning network can be chosen based on aspects of the data. For example, in a scenario where data sent through a communications channel suffers a particular type of fade or other distortion, the machine-learning network 212 can learn the particular distortion and translate corresponding input data to output data with less bit rate error and with less complexity and power usage compared to conventional systems. In some cases, data or models for users of different fading or mobility or spatial locality may be employed or aggregated further to train specific models for sets of users or user scenarios within various sectors or cells.

Stage D shows the output signal from the symbol detection 216 is sent for further processing 222, which can represent any other process after symbol detection 216. For example, further processing 222 can include subsequent modem stages such as error correction decoding, cyclic redundancy checks, LDPC check bits, de-framing, decryption, integrity checks, source decoding, or other processes.

In some implementations, the performance analysis 218 is used to compute values associated with one or more communications handled by the machine-learning network 212. For example, the performance analysis 218 can use symbol values or bits to compute quantitative quality metrics such as error vector magnitude (EVM) or bit error rate (BER) or frame error rate (FER) or code-block error rate (BLER). Such quantitative quality metrics can help determine comparative measurements between one or more communications processing systems or between one or more different set of machine learning models, architectures or sets of weights.

In some implementations, output from the performance analysis 218 is used by the machine-learning updates 214 to help improve the machine-learning network 212. For example, quantitative quality metrics or other data calculated or obtained by the performance analysis 218 can be used to help improve the machine-learning network 212. In some cases, the performance analysis 218 can detect trends or other data related to one or more calculations performed by the machine-learning network 212. This data can be used to inform specific weight or parameter modifications within the machine-learning network 212. For example, common objectives and distances include minimizing EVM or BER over the link by updating the weights on the same input data measured. In some cases, augmentations may be applied to the input data in order to magnify the effective number of input values that are being optimized, for example the phase, amplitude, fading or other effects applied to the input value may be altered upon input to the machine learning network update process to accelerate training on a smaller quantity of data.

As shown by FIG. 2A, in some implementations, elements including machine-learning network updates 214, the performance analysis 218, and the known reference and data subcarriers 220 as well as related operations in stage C are performed by the receiving device 208. In other implementations, operations related to stage C are performed by other elements. For example, an external element communicably connected to the receiving device 208 can be used to obtain the known reference and data subcarriers 220, as well as perform the corresponding performance analysis 218 from the symbol detection 216 as means of obtaining the machine-learning network updates 214.

Similarly, sub-elements shown in the example of FIG. 2A within elements such as the transmission device 201 and the receiving device 208 are, in some implementations, not within either the transmission device 201 or the receiving device 208. For example, the machine-learning network 212 can be stored within a separate device that is communicably connected to the receiving device 208. As another example, the reception and digital conversion 209 can perform the main operations of the receiving device 208 and a separate device communicably connected to the receiving device 208 can perform other operations, including, for example, synchronizing and extracting subcarriers and, in general, perform operations discussed in reference to the synchronization and extraction 210. The device communicably connected to the receiving device 208 can store and execute the various layers of machine-learning network 212 and, in general, perform operations discussed in reference to the machine-learning network 212. The device communicably connected to the receiving device 208 can also detect symbols based on the output of the machine-learning network 212 and, in general, perform operations discussed in reference to the symbol detection 216A.

In some implementations, training the machine-learning network 212 is performed over the air with, by sending RF signals over, an actual physical communications channel 207 between the transmitting device 201 and the receiving device 208. Over the air training or online training may be performed prior to system deployment or the machine-learning network 212 and the system 200 can continue to perform updates either continuously or periodically while carrying communications traffic.

In some implementations, a set of profiles, such as urban, rural, indoor, macro, micro, femto, or other profiles related to channel behavior correlated to or predicted by deployment scenario, is used to determine an initial model of the machine-learning network 212 that is deployed, and used to configure processes for determining augmentation or other training parameters for the machine-learning network 212. In some instances, data or models may be shared in cloud environments or network sharing configurations between specific gNB cells to improve initial machine-learning network models, or to jointly improve models within multiple environments with shared phenomena. For example, cells within a grid of cells that share similar interference, cells with similar delay spreads, or cells with other similar behaviors, can be used to improve the effectiveness, speed, or performance of the machine-learning network 212.

In some implementations, a simulated communications channel 207 is used for training the machine-learning network 212. For example, channel models, such as 5G-NR standardized time-delay line (TDL) models, Rayleigh or Rician channel or standard algorithms with standardized channels such as international telecommunications union (ITU) or 3GPP fading channel models including fixed taps, delay spreads, Doppler rates, or other parameters within a well-defined random process, can be used to simulate the communications channel 207.

In some implementations, the machine-learning network 212 is pre-trained. Pre-training can be based on simulation.

Pre-training, depending on implementation, can use simplified statistical models (e.g., Rayleigh or Rician, among others), a COST 2100 model, tapped delay line (TDL-A, TDL-B, TDL-x, among others) model, or standard LTE or NR channel model, among other models. Pre-training can also use Ray tracing or geometric model of sector for deployment or channel generative adversarial network (GAN) machine learning networks trained to reproduce the channel response of one or more cells based on prior measurement or simulation.

In some cases, the training may use known values in order to compute the channel response at each step. For instance, preamble values, pilot values, known references, known data values can be used in training. In some cases, a decision feedback approach can be used. For instance, a decision feedback approach can include demodulating or decoding data to obtain the estimated symbols or bits for the allocation. The data can be one or more of a resource element, a packet, burst, frame, resource unit (RU) allocation, a codeword (e.g., LDPC or Polar code block), physical downlink shared channel (PDSCH) allocation, or physical uplink shared channel (PUSCH) allocation, among other forms of data. In some cases, the data can then be verified, for example by checking CRC fields, encryption or HMAC fields, or parity information (e.g., LDPC parity check bits), and then by using these values in order to provide target information for updating the machine learning model.

In some cases, training may include using other estimation or equalization approaches. For example, linear MMSE, max likelihood, successive interference cancellation (SIC), or other suitable approaches can be used to produce estimates of the channel response in certain instances (e.g., when the machine-learning network model is not well trained) or the training may use the existing learned estimation or equalization model to produce the estimates and use information such as decision or FEC feedback to improve machine-learning network models prior to training. In the latter case, transition from a general statistical model to a learned model may occur when the signal to interference plus noise ratio (SINR) exceeds a threshold value, or at another point (e.g., based on channel characteristics or output performance measures) where the performance of the learned model outperforms the general statistical model.

In some cases, augmentation is used to improve or accelerate the training of the machine-learning network 212. In such cases, multiple copies of data specific to training may be used with different augmentations when training the machine-learning network 212. For example, different channel effects such as noise, phase rotation, angle of arrival, or fading channel response, among others, can be applied to one or more transmit or receive antennas of the devices 201 or 208, or both. The copies of data can be used to increase the amount of effective usable training data available from a finite or smaller set of measurement data into a near infinite set of augmentation measurement or simulated data. This can assist in faster model training of the machine-learning network 212, training more resilient, more generalizable, or less-overfit models used for the machine-learning network 212, over much less data and training time, among others.

Figure 2B:
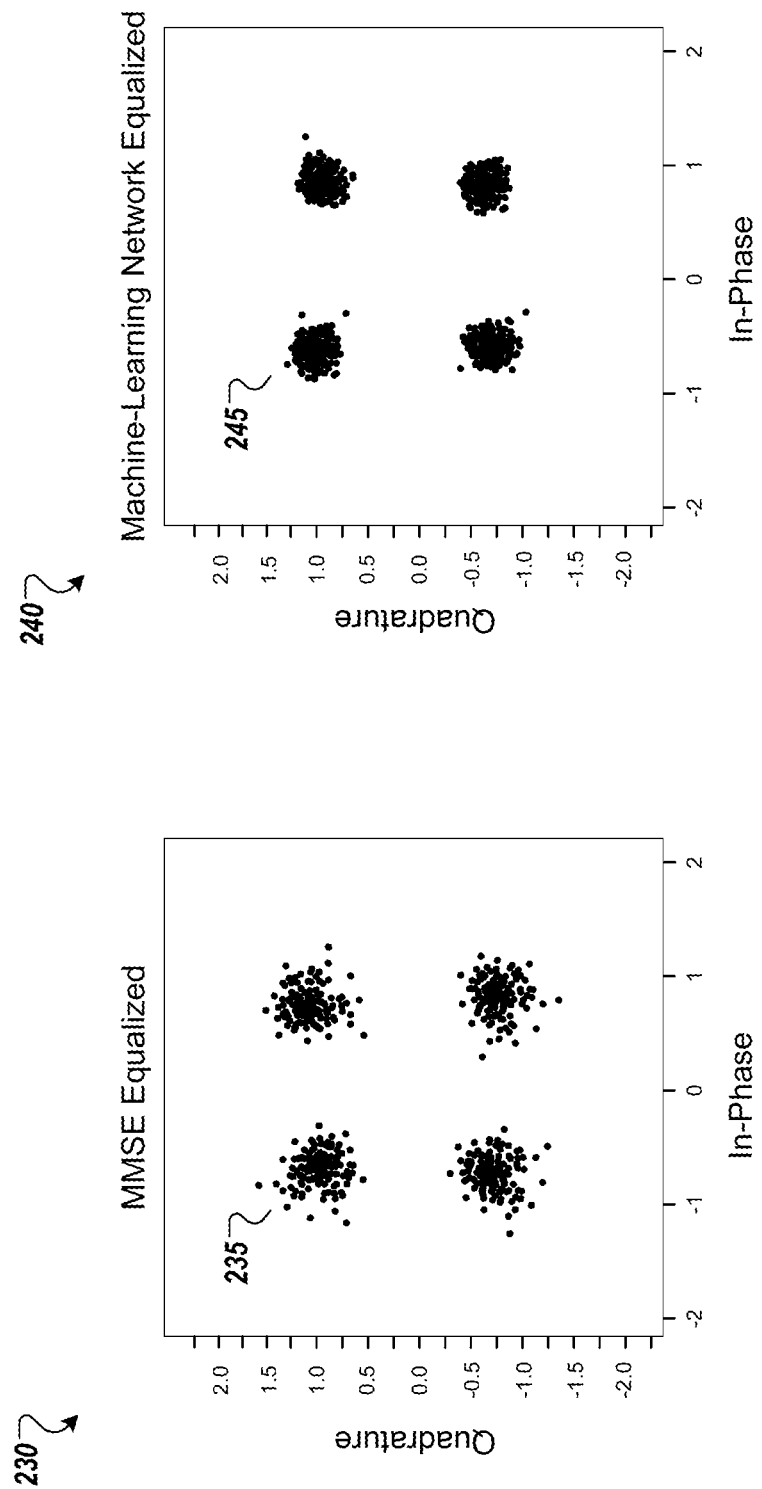
FIG. 2B is a diagram showing an example of improved error vector magnitude (EVM) upon using a machine-learning network for processing digital communications.
Figure 2C:
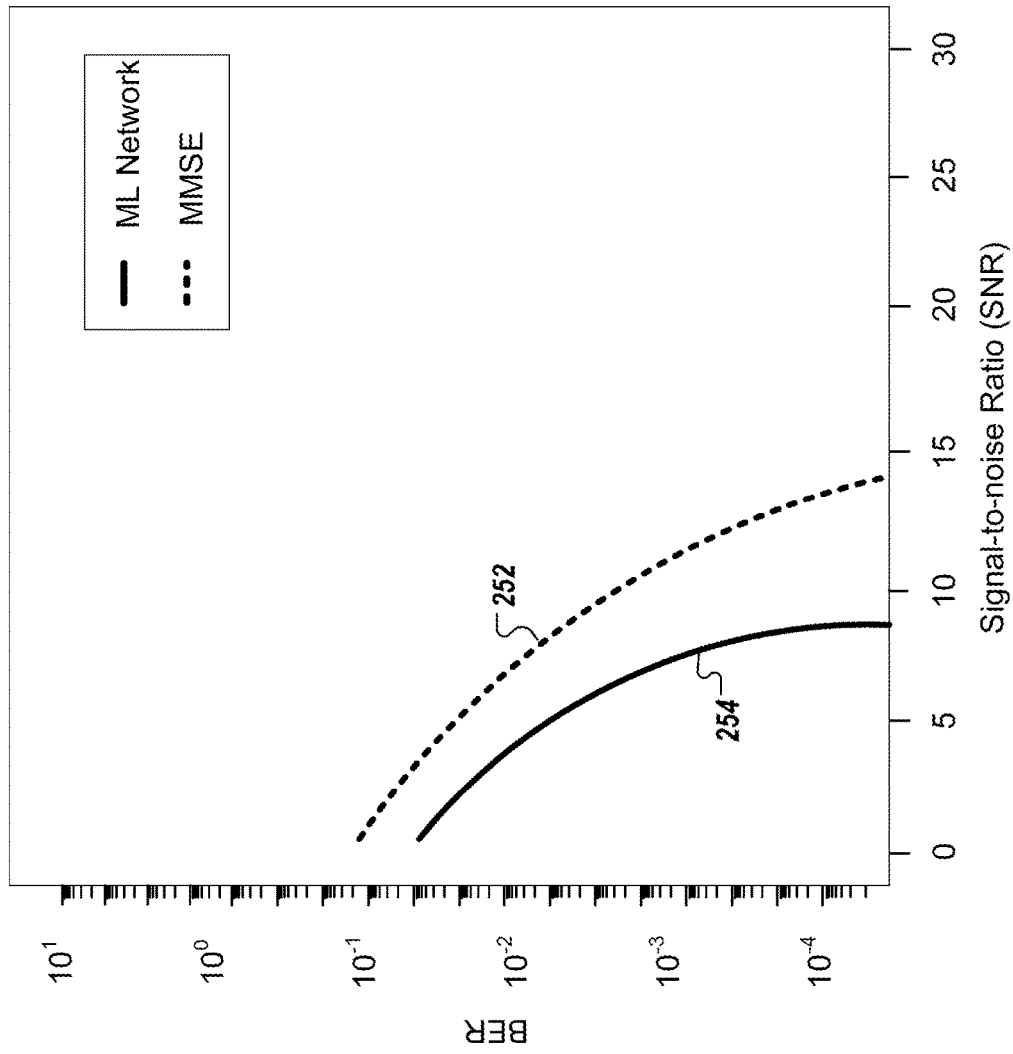
FIG. 2C is a diagram showing an example of improved bit error rate (BER) over signal-to-noise ratio (SNR) upon using a machine-learning network for processing digital communications.

Some of the performance improvements, as discussed in reference to the implementation shown in the example of FIG. 1, are shown in FIGS. 2B and 2C. FIGS. 2B and 2C represent two examples of performance improvements corresponding to the machine-learning network approach of the implementation of FIG. 1. The performance improvements shown in FIGS. 2B and 2C, however, do not represent all possible improvements from all possible implementations of the machine-learning network approach applied to other tasks or processes related to processing digital communications. Other improvements are also possible upon using the machine-learning network for processing digital communications, as described in this specification.

FIG. 2B is a diagram showing an example of improved error vector magnitude (EVM) upon using a machine-learning network for processing digital communications. The figure presents a performance comparison between a conventional approach to estimation and equalizing involving MMSE algorithms (plot 230) and a machine-learning network approach to the same task (plot 240). Plot 230 illustrates the recovered data symbol tiles produced by using MMSE, which involves multiplication of the estimated channel inverses from the network with the received symbol value tiles. Plot 240 illustrates recovered data symbol tiles produced by a machine-learning network approach as discussed with respect to FIGS. 1 and 2A.

Both the conventional approach involving an MMSE algorithm, and the machine-learning network approach obtain a Quadrature Phase Shift Keying (QPSK) received symbol set correctly. However, plot 240 shows that the machine-learning approach produces more concentrated clusters of point estimates surrounding the possible symbol values. A visual comparison of the estimations of the conventional approach and the machine-learning network approach can be made by comparing item 235, representing estimation produced by MMSE equalization, and item 245, representing estimation produced by the machine-learning network equalization, which shows that the cluster for item 245 is more concentrated compared to the cluster for item 235, indicating a lower EVM when receive signals are processed using the machine-learning network. Processing receive signals using the machine-learning produces a lower cluster variance and lower EVM, compared to using MMSE. Lower cluster variance and lower EVM correlate to better signal reception and better receiver performance within a communications processing system.

FIG. 2C represents another performance metric comparison between a conventional approach to estimation and equalization involving MMSE algorithms and a machine-learning network approach as described with respect to FIGS. 1 and 2A. FIG. 2C shows a plot 250 of bit error rate (BER) over signal-to-noise ratio (SNR), illustrating improvement obtained upon using a machine-learning network for processing digital communications (item 254), compared to using MMSE (item 252). The conventional approach using MMSE shown in item 252 results in a higher BER for any given SNR, compared to the machine-learning network techniques shown in item 254. In other words, to achieve a certain BER, the conventional approach involving MMSE requires a greater SNR compared to machine-learning network techniques. The latter produces fewer bit errors even with more noise in a given signal or low SNR.

FIGS. 2B and 2C show, in part, performance improvements offered by a given implementation of the machine-learning network approach within communications processing systems, for example system 100 or system 200. The performance improvements of the machine-learning approach are demonstrated by comparison to conventional approaches that involve separate calculations and stage processing. Using the machine-learning network produces more accurate and consistent estimates of channel response, lower cluster variance, and lower error vector magnitude resulting in better performance within a communication processing system. The machine-learning network approach also performs better than the conventional approach in that it produces lower BER for a given SNR, or uses lower SNR to achieve a target BER. In some implementations, significant benefits in spatial re-use and computational efficiency are achieved through better estimation and reduced computational complexity, for example where multi user MIMO (MU-MIMO) and efficient low-cost deployment and operation are concerned.

Figure 3:
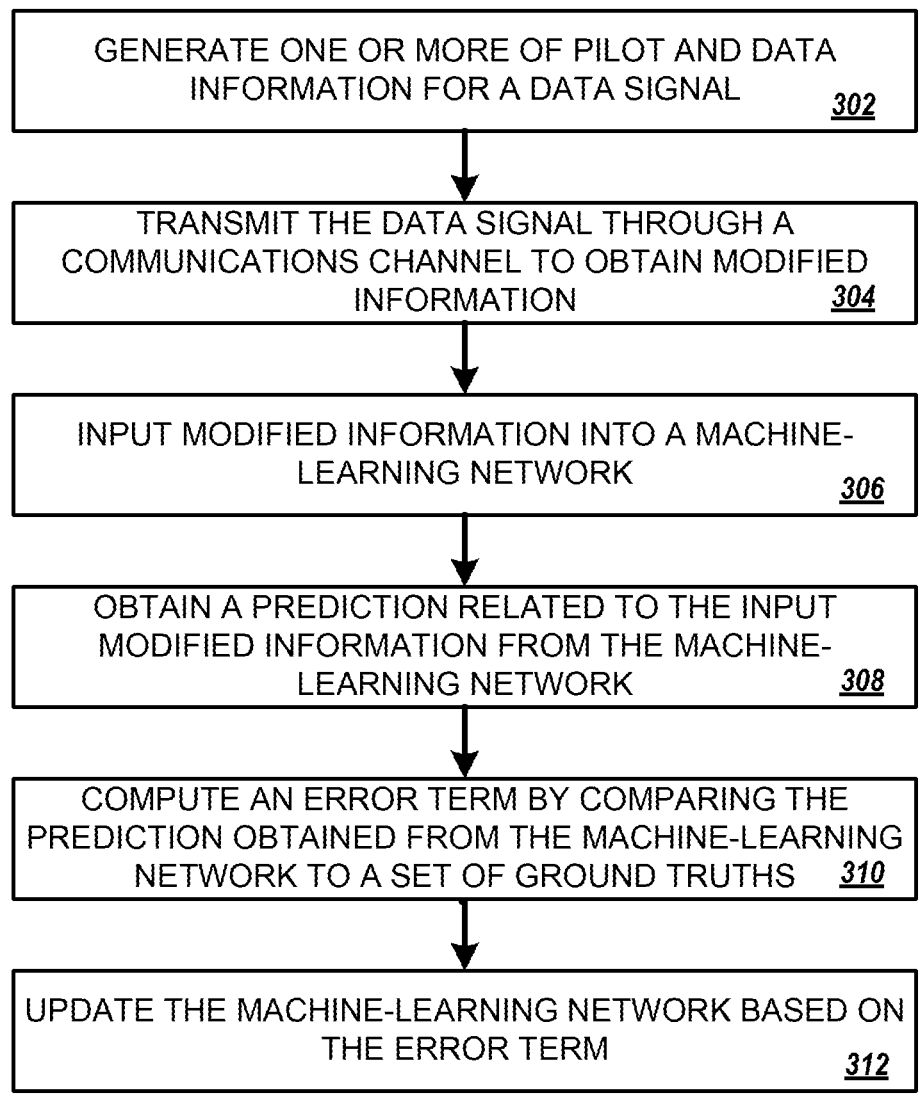
FIG. 3 is a flow diagram illustrating an example of a method for training a machine-learning network for processing digital communications.

FIG. 3 is a flow diagram illustrating an example of a method 300 for training a machine-learning network for processing digital communications. In some implementations, the method 300 is used to train the machine-learning network 120 or the machine-learning network 212, and is performed by one or more computing devices in the system 100 or the system 200, such as the device 208 as described with respect to FIG. 2. Accordingly, the following sections describe the method 300 with respect to the system 100 or the system 200. However, the method 300 can also be performed by devices in other systems to train other machine-learning networks.

The method 300 includes generating one or more of pilot and data information for a data signal (302). In some implementations, the pilot and data information is already generated and a resulting signal is received. For example, in FIG. 1, the input data 111 with pilot and data information of a data signal is generated and obtained by the system 100 as shown in the illustrated example. In other implementations, for example as discussed in reference to FIG. 5, a machine-learning network is involved in operations related to the transmitting of pilot and data information including the generating of pilot and data information. The pilot and data information can be, for example, pilot subcarriers, data subcarriers, pilot resource elements, data resource elements, or any combination of these.

The method 300 includes transmitting the data signal through a communications channel to obtain modified information (304). For example, in some implementations, the communications channel is the communications channel 207 in the system 200. As discussed previously, the communications channel can be a simulated channel where input data is modified by one or more randomly or deterministically influenced processes to generated modified data. For example, digital information, converted into analog signals, is transmitted through an additive white Gaussian noise (AWGN) channel or other channel simulations. Modified information, taken as output from the simulated communications channel can then be used as input into a machine-learning network, e.g., machine-learning network 212. Alternatively, the communications channel can be a real channel where input data is converted to analog RF OFDM signals by the transmitting device, e.g., device 201, and transmitted to a receiving device, e.g., device 208. The RF signal received at the receiving device may be modified based on the process of sending, transmitting over the communications channel, and receiving the data signal.

The method 300 includes inputting modified information into a machine-learning network (306). For example, in the system 200, an OFDM signal sent over the communications channel 207 is received by the receiving device 208. The receiving device performs additional processing on the received signal including digital conversion as well as synchronization and extraction. After the signal has been converted to digital bits and information has been synchronized and extracted, the machine-learning network 212 determines a time-frequency grid of modified information or subcarriers corresponding to the data sent from the transmitting device 201 to the receiving device 208.

The method 300 includes obtaining a prediction related to the input modified information from the machine-learning network (308). For example, a prediction can be related to modified subcarriers used as input for the machine-learning network. A prediction can be obtained for one or more channel responses of the channel or for each tile in a subcarrier or resource grid, e.g., as shown by plot 111 in the system 100 using the machine-learning network 120. A prediction can also be obtained for the inverse channel response of the communications channel, e.g., communications channel 207 in the system 200 using the machine-learning network 212. A prediction can alternatively be the transmitted tile values prior to transmission or corresponding bit, log-likelihood, codeword or similar values corresponding to transmitted information.

The method 300 includes computing an error term by comparing the prediction obtained from the machine-learning network to a set of ground truths (310). For example, FIG. 2A the known reference and data subcarriers 220 in the system 200 form a set of ground truths from which an error term can be computed. A set of ground truths can be obtained from knowledge of the transmitted symbols from the generation process, from a decision feedback process (e.g., FEC, CRC, LDPC, among others), from reference tones, or from some out-of-band communications of the values. In addition to computing an error term, a rate of change of the error term may be computed, as described with respect to the system 200. In some cases, the error term can be output from one or more loss functions.

The method 300 includes updating the machine-learning network based on the error term (312). For example, in the system 200, the machine-learning network updates 214 computed from the raw input used for the machine-learning network 212 and the known reference and data subcarriers 220, can be used to determine one or more modifications to one or more parameters, weights, or other aspects of the machine-learning network 212.

In some cases, a rate of change may be computed for a loss function with respect to one or more parametric weight values within a machine-learning network. For example, an optimization process such as gradient descent, stochastic gradient descent (SGD), Adam, AdamW, Rectified Adam (RAdam), or others, may be used to update one or more weights in the machine-learning network to improve the accuracy of the predicted outputs or to minimize the loss computed by the loss function. In some cases, multiple steps of the optimizers and/or multiple sets of weights may be employed, for example at different rates to stabilize and improve the optimization process, which are achieved, in some cases, by using the Lookahead neural network optimization technique.

Figures 4A, 4B:
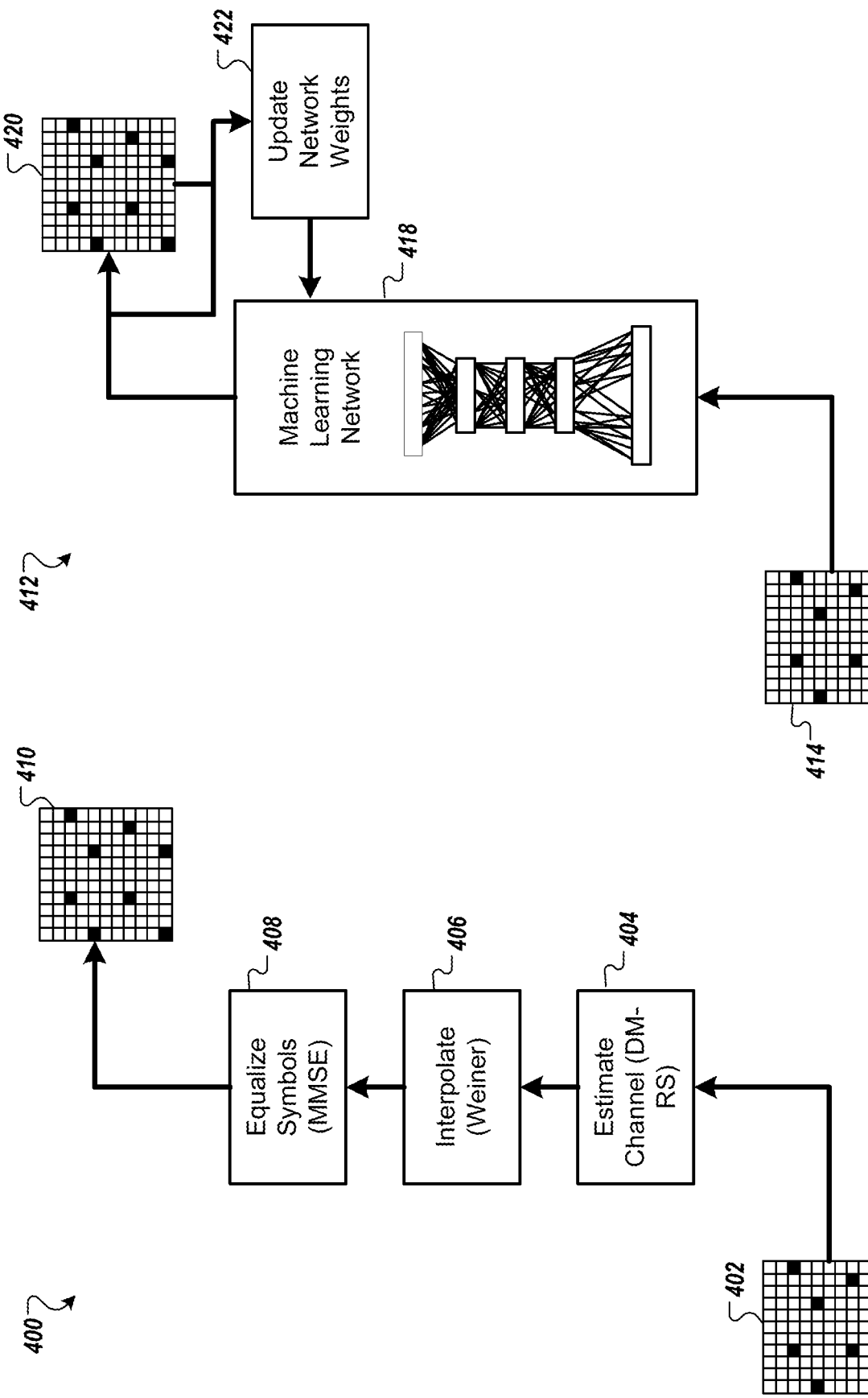
FIGS. 4A and 4B are block diagrams showing a system for processing digital communications without and with using a machine-learning network, respectively.

FIG. 4A and FIG. 4B are block diagrams of examples of systems used for processing digital communications data. FIG. 4A is a block diagram showing a first example system 400 for processing digital communications without using a machine-learning network. FIG. 4B is a block diagram showing a second example system 412 for processing digital communications using a machine-learning network 418. The machine-learning network 418 of the second system 412 can be used to replace one or more elements of the first system 400, which represents a conventional approach. For example, the first system 400 includes receiving an unequalized resource grid 402 by an estimate channel element 404. The first system 400, in this case, uses a demodulation reference signal (DM-RS) approach as shown in the estimate channel element 404. Other methods of estimating a channel are known in the art and could also be used in the first system 400.

After estimating the channel for the unequalized resource grid 402, the first system 400 continues by interpolating the unequalized resource grid 402. In this case, the first system 400 uses a Weiner interpolation method as shown in item 406. Although standalone interpolation methods provide relatively robust methods for finding error or confidence levels associated with each point on an interpolated grid, standalone interpolation methods can be performance intensive. In some cases, an inverted matrix whose size is the number of significantly correlated data points is calculated. Current and next generation communications systems introduce greater and greater numbers of significantly correlated data points to be inverted. The method shown in FIG. 4B simplifies and improves calculation by using the machine-learning network 418. Operations conventionally performed in stages as shown in FIG. 4A are performed in the machine-learning network 418. The machine-learning network approach as shown in FIG. 4B can be used to reduce performance demands and reduce cost of communications equipment, deployments, and operations.

After interpolating, the first system 400 equalizes the symbols of the previously unequalized resource grid 402 as shown in item 408. In this case, a minimum-mean-squared error (MMSE) approach is used. The equalized symbols element 408 can output a number of resource elements extracted from the unequalized resource grid 402. In some cases, the unequalized grid 402 is a grid of K by L where K represents a number of subcarriers and L represents a number of OFDM symbols, and where additional grids representing multiple antenna elements, users or layers within 402 and 410 may additionally increase the complexity of the process.

The final equalized grid of symbols 410 computed for a user or further processing steps is shown in item 410. FIG. 4A introduces a number of time intensive matrix calculations among other processes. The machine-learning network 418 of the second system 412 alleviates issues caused by the complex calculations involved in the first system 400 and, in the process, improves performance.

In some implementations, the elements of the first system 400 are a set of rigid cascaded digital signal processing (DSP) operations optimized for Rayleigh or other statistical or simplified channel or channel models. For example, purpose-built hardware including application-specific integrated circuits may be used to perform the processes illustrated in the first system 400.

FIG. 4B shows an example of a way that conventional approach of calculating learned estimation and equalization processes can be replaced by a machine-learning network such as machine-learning network 418. In some implementations, an end-to-end machine-learning network, such as the machine-learning network 418, can replace estimation, interpolation, equalization processes with a fast inference process which can handle many different known channel properties of a communication link, or channel state information (CSI) modes, when extracting and estimating symbols for a user's allocation across N antennas.

FIG. 4B shows an unequalized resource grid 414 similar to the unequalized grid 402 used in the first system 400. The unequalized resource grid 414 is used as input for the machine-learning network 418. The machine-learning network 418 can be pre-trained or trained over the air using one or more communications channels. In some implementations, the machine-learning network 418 is similar to the machine-learning network 120 of the system 100, or the machine-learning network 212 of the system 200.

In some cases, a 64-quadrature amplitude modulation (QAM) 5G-NR system, or other fixed or learned modulation schemes, transmitted over the air in the normal physical downlink shared channel (PDSCH) or physical uplink shared channel (PUSCH) form, can be received using the conventional MMSE, LMMSE, or similar case, in order to achieve a certain bit error rate (BER) or error vector magnitude (EVM). In another case, a fully learned estimation and equalization network can be trained using a dense or fully connected network architecture to achieve a lower BER or EVM. In some cases, this can result in a large number of parameters and thus introduce an issue of overfitting. The result of overfitting is that the machine-learning network is difficult to use broadly or on differing communications channels.

In an effort to reduce overfitting, the machine-learning network 418 shown in FIG. 4B is trained as a U-Net or other form of convolutional network that does not result in a large number of parameters and overfitting as discussed above. By using a multi-scale architecture such as U-Net or other convolutional network, the number of parameters used to describe the machine-learning network 418 can be reduced which allows the network to generalize better to different communications channels, train more effectively on less data, and can result in lower computation complexity and more efficient algorithms for certain hardware and processor types. In laboratory tests, it can also be shown that the U-Net approach and similar multi-scale approaches in general can achieve much lower EVM and BER than other approaches. In some cases, this is because the parameter search space is much smaller resulting in better performance and better generalization.

The present specification is not limited to a U-Net convolutional network. Other architectures that meet similar criteria can also be adapted for this application. For example, W-Net or other architectures that provide a degree of narrowing or down-sampling convolutional scheme, a sparse representation, or convolutional up-sampling can be used. In some cases, architectures with some form of skip-connection or residual layers can be used.

The machine-learning network 418 receives the unequalized resource grid 414 and infers, based on the one or more connected layers of the machine-learning network 418, correct equalized symbols 420 that can be obtained by a user or further processes in the same element or elements communicably connected to the second system 412. Decision feedback, shown as the arrow between the equalized symbols 420 output from the machine-learning network 418 can be used in implementations such as the second system 412 that includes the machine-learning network 418.

Decision feedback can be used to further improve the machine-learning network before, during, or after deployment. Decision feedback or other performance analysis can be used to update network weights or other aspects of the machine-learning network 418. The process of updating the machine-learning network 418 is shown in item 422 of FIG. 4B. The updates to weights within the machine-learning network 418 can be sent to the machine-learning network 418. The machine-learning network 418 can receive the updates and modify, accordingly, one or more weights within one or more layers of the machine-learning network.

The update network weights process may run at a variety of rates. The update process may run at every allocation or faster with augmentation. Alternatively, it can run faster or slower. In some cases, updates to network weights may not be used at all. Updates can be obtained using online learning to update the network weights over one or more communications channels where the one or more communications channels are used to send data back and forth resulting in network weights or modifications to network weights or other aspects of the machine-learning network 418, being produced and sent to the machine-learning network 418. In some cases, the degree of resources dedicated to updates may be dictated by available resources and those needed for forwards inference (e.g., estimation, equalization, among others) by the machine learning network and other processing tasks at the time.

In some cases, this may happen on a device such as a baseband unit (BBU) or a distributed unit (DU) processor, or within a small cell or distributed antenna system (DAS) system. In some cases, the update process, or other processes shown in FIG. 4A or FIG. 4B can be performed on the unit itself, on a cloud server for updating models or another device communicably connected to an element of FIG. 4A or FIG. 4B. The updating process can make use of data from one or more sectors at a given time. In some cases, this can help improve training as well as result in greater effectiveness of the trained, or partially trained, machine-learning network. In this way, one or more network elements may perform network weight sharing or federated learning among a number of elements with different sets of data to arrive at a more globally optimal solution.

Figure 5:
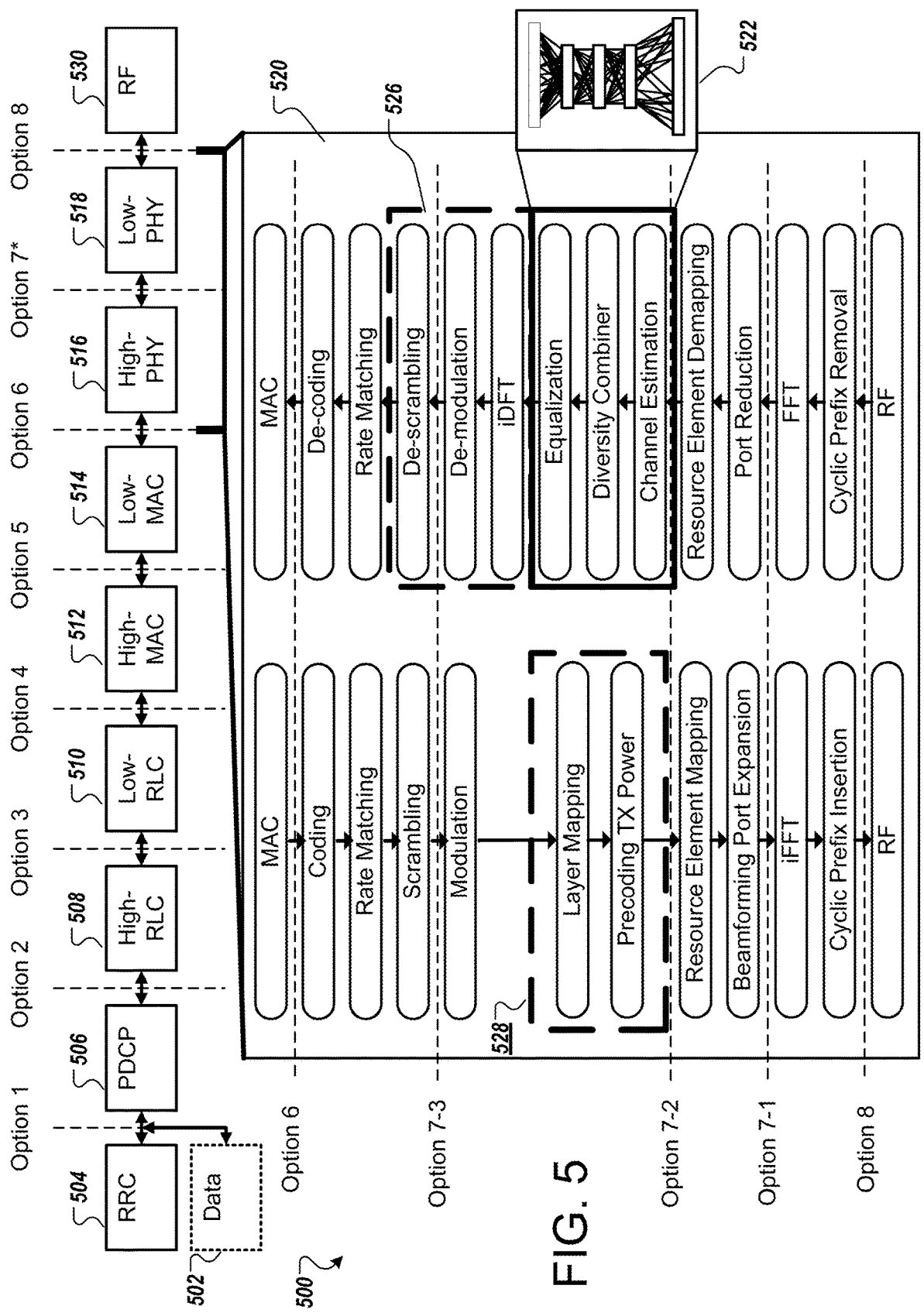
FIG. 5 is a diagram showing processing stages within a communications system.

FIG. 5 is a diagram showing processing stages within a communications system 500. FIG. 5 illustrates a typical signal processing chain for 4G or 5G wireless base stations along with optional split points (e.g., for front-haul or mid-haul) shown as options 1-8. In both upstream and downstream directions, radio signals go through a series of signal processing bocks. The double pointing arrows between the functional blocks in FIG. 5 show both the upstream and downstream possible flows for the data signal during processing. FIG. 5 is an example of signal processing stages that typically take place within the RU, DU, or CU within an O-Ran or vRAN system for 5G-NR, 4G, or 5G+ deployment, where several options for splits between the RU and DU are possible given by options 8, 7*, and 6. 7 bears an asterisk in FIG. 5 as the option 7 split, as shown in item 520, generally includes 3 different common splits labeled 7-3, 7-2, and 7-1. Each split has different bandwidth and latency requirements between elements and varies per frequency-bandwidth, number of antenna elements and other parameters. Splits 7-2, 7-3 and similar are adopted by deployed virtual RAN (vRan) systems. The machine-learning approach can be targeted to the requirements and efficiency of the resulting DU within such a split but can similarly be used for a variety of split configurations. The split in the PHY layer typically concerns allotting processing stages to either a RU or DU within a system. FIG. 5 shows how a machine-learning network can fit into the communications system 500. In some cases, the machine learning network can reside instead within the RU, where processing stages before or after the FFT, inverse FFT (IFFT), or other processing stages including synchronization may be determined by these machine learning networks and updated based on signal quality metrics generated locally or passed as feedback from the DU or CU.

The options shown in FIG. 5 represent possible splitting points for a DU or centralized unit (CU) to divide processing stages. The physical layer including High-PHY 516 as well as Low-PHY 518 and radio frequency (RF) 530 are conventionally performed by a DU with the data link components of processing including Low-MAC 514, High-MAC 512, Low-RLC 510, High-RLC 508, and PDCP 506 generally being performed by a CU.

In the processing stages, the elements in the signal processing chain flow from the RF stage 530 to the PHY layers including the Low-PHY 518 and the High-PHY 516. Aspects related to the functions performed by these functional blocks are shown in item 520. On the right side, a process flow starting with an RF signal is shown. Item 520 shows how the machine-learning network, as discussed in previous figures, can fit into existing systems using similar processing stages as shown in FIG. 5.

The process can begin, as shown in the example of FIG. 5, with an RF signal being received. Pre-processing stages such as cyclic prefix removal, fast Fourier transform (FFT), port reduction and resource element de-mapping, can all be used to generate a form of an unequalized resource grid. The unequalized resource grid from pre-processing steps can be sent to a machine-learning network 522 of the system 500. In this case, the machine-learning network 522 performs channel estimation, diversity or other antenna combining, and equalization before sending the resulting equalized symbols to other elements in the process flow including inverse discrete Fourier transform (iDFT). Diversity or other antenna combining, in this case, can be the process of obtaining a single improved signal from one or more received signals of a diversity reception device. In some cases, this can be a signal sent in two or more communications channels with different characteristics, or sent from two or more users. In some implementations, the machine-learning network 522 is similar to the machine-learning network 120 of the system 100, or the machine-learning network 212 of the system 200.

FIG. 5 illustrates other possible processing stages for the machine-learning network 522. The dashed line of 526 shows other possible elements that could be combined within the machine-learning network 522 to increase the number, or change the type, of processing stages performed by the machine-learning network 522. The example of FIG. 5 shows an additional iDFT processing stage, a de-modulation stage, and a de-scrambling stage as possible additions to the machine-learning network 522 but the present disclosure is not so limited. In other implementations, other processes, including other processing stages shown in FIG. 5 or within the signal processing stage from RF 530 to radio resource control (RRC) 504 as well as from RRC 504 to RF 530, can be included in one or more machine-learning networks such as the machine-learning network 522 of FIG. 5.

The 7-2 split as shown in item 520 is commonly used and represents one possible split in which the current implementation of machine-learning network within communication processing can be used. The box of 522 showing the placement of the machine-learning network 522 also shows conventional statistical signal processing algorithms that it can effectively replace. This area within a conventional processing stage represents a primary location in which a machine-learning network can be inserted into the processing stages.

By replacing the conventional processing stages of channel estimation, diversity combiner (or MU-MIMO or denser MIMO combining), and equalization, the machine-learning network 522 or learning model is better able to exploit channel distribution information and is further able to drive down the power consumption of a communications processing system. This is especially the case within a many-antenna configuration. In some cases, while learning these tasks, the machine-learning network 522 is able to help suppress any non-linearities, distortion, or structured interference within the signal or band without additional specialized processing for these functions.

However, as discussed above, in further instances, a machine-learning network may perform other tasks in addition to, or instead of the conventional tasks already mentioned. Other tasks that could be performed include the tasks of the iDFT, the demodulation, the descrambling, the rate matching, the decoding processes, or even cascaded source-decoding tasks such as video decoding processes in specialized cases, or additional probabilistic learning and correction of MAC content based on historical probabilistic information and training. These other tasks can be performed within a machine-learning network. In some cases, a machine-learning network, such as the machine-learning network 522 of FIG. 5, can be trained for different subsets of the receive chain side shown on the right of item 520. In some cases, the machine-learning network 522 can output channel estimates per element in grid. In some cases, the machine-learning network 522 can output estimated symbols per element in grid. In some cases, the machine-learning network 522 can output the soft log-likelihood (LLR) information per symbol or per-bit for decoding. In some cases, the machine-learning network 522 can output an estimate of which decoded code word, frame or bits were received.

The machine-learning network approach, as shown in FIG. 5, can be a graduated approach where the initial capability is shown in element 522, while over time processing stages performed by the machine-learning network 522 can become a greater and greater percentage of the communications processing shown in the processing chain and, for one example, in the elements of 526. This graduated approach allows for a transition over time from conventional algorithms to fully learned and end-to-end optimized algorithms based on data, allowing for the iterative de-risking, testing, deployment, and optimization of ever greater segments of the communications stack in an end-to-end data driven form. Further optimizations within the CU or higher may occur to help assist with resource allocation and scheduling tasks for instance by preferring resource blocks which have better performance within DU algorithms, or resource allocations which are recurring so as to provide for better training and inference consistency, or to leverage more information within the channel estimation process within the scheduling optimization process than is leveraged today within more simplistic algorithms such as existing Proportional Fair schedulers (PF), which operate generally with much more limited knowledge about the constraints and benefits of allocations (e.g., simplifying things to power allocation).

Separately, on the transmission side, shown on the left of the item 520 starting from MAC proceeding in processing stages to RF as shown, the problems of layer mapping and pre-coder transmission calculation are shown. Because detailed CSI information is used within the pre-coding of downlink multiple input, multiple output (MIMO) precoding weights, a machine-learning network used for receiving and processing of a received signal, as shown in item 522 on the right of item 520, can also be used to produce pre-coding weight values for single or multi-user MIMO schemes simply through a learning process. This is advantageous because it removes the need for linear matrix inversion or singular value decomposition (SVD) operations, which can be comparatively more power consuming, and computationally slower. The operational expense and capital expenditures for the network operator can be also reduced by the introduction of a processing element with less complexity and better performance. This is advantageous within the context of MU-MIMO, where pre-coding weights are used to optimize for several UEs in the downlink based on their CSI information. CSI is a case where inference can also help better influence DL scheduling decisions. In MIMO systems, complexity can grow quickly as a function of the number of UEs and the number of antennas, which can be problematic for dense urban deployment scenarios, especially in low and mid-band deployments. Within the context of time-division duplex (TDD) systems, CSI can often be directly inferred using channel-reciprocity along with error feedback from the UE, whereas in FDD systems, feedback from UE protocols (e.g., CSI-RS) may be relied upon or other sensor inputs such as received values on the downlink band, may help optimize the prediction of the FDD DL precoding weights based on the UL receive CSI.

In some implementations, processing may run on a DU. For example, the DU can be a generic server platform, for instance an Intel server platform, which may employ one or more accelerators for instance it may use field-programmable gate array (FPGA) offload for the error correction decoding. The DU may use a graphic processing unit (GPU) or a Tensor or Vector processor or other systolic array to perform the neural network operations in order to reduce power consumption and to improve throughput allowing a system, such as the system 500, to perform decoding of more sectors, more radio units, more users per sector (e.g., in MU-MIMO configurations), more antennas per sector, and generally supporting higher density and cheaper operation of the DU function within the network by using more efficient hardware and algorithms to scale more efficiently. In some cases, using a machine-learning network, such as the machine-learning network 522 of FIG. 5 to perform one or more tasks of signal transmission or reception can enable improvements as discussed above for a system that processes communications such as the system 500.

In some implementations, software defined in a 5G-NR system can vary burst allocation performance in a slot or frame in order to generate and validate the approach over a wide range of multi-user allocation and scheduling modes or configurations. As discussed, a machine-learning network approach offers advantages in designing transmission and reception of signals in specific communications channels that may have peculiar fading modifications or other effects on sent data signals. In some cases, signals sent in different directions or different spatial paths can be allocated frames or portions or frames. A spatial equivalent that relates multi-user spatial allocations to resource block (RB) allocations can teach various separate channel response regions for each user or RB allocation.

In some cases, a system, including elements within the system, can be tuned to work across a number of different users in a cell that each has a unique channel response. Each users in a cell may be allocated different sets of resource elements (RE) for each uplink transmission by the base station scheduler. In some cases, a machine-learning network can learn to equalize many different channel response from different user equipment (UE) but which all draw from some distribution for the full sector. This distribution may change or be conditioned on other aspects over time, such as time of day, day of week, event activity, or other physical phenomena which can change the overall distribution of channel statistics for all user allocations within the cell.

By learning certain types of neural networks or using specific architectures, for instance convolutional neural networks for estimation tasks, U-Nets, or other similar architectures which employ convolutional features, we can learn invariance to which RE's are used for each allocation. In this case, the architecture helps to reduce overfitting to any specific frequency offset for specific user, allowing the resulting algorithm to generalize to different RE allocations for each user. In some instances, information may be passed into the machine learning model (e.g., in a corresponding resource grid of control information) in order to specify where different allocations are taking place, which elements are data and pilots, and which modulation or coding index (MCS) is used for each, or which elements are allocated to multiple UEs. In general, it is important that the model converges for many UEs in a sector, where training off many UE's CSI information can converge to a good solution for all behaviors and channel responses for different uses in a cell.

In some implementations, different RB allocations correspond to different spatial locations and accordingly different channel responses. In addition, UE allocation can move around in time/frequency space as RB allocation varies frame to frame or slot to slot. There are numerous ways where the CSI information and the quality of estimation metrics can be used to jointly optimize problems such as where RB allocation are granted for each UE, which UEs are co-allocated within a slot, if a UE is allocated similar allocation repeatedly to help estimation, or how other processes within the scheduler can be co-optimized using low-level L1 and CSI information and quality metrics such as BER, EVM, and frame error rate (FER) and aggregate metrics for the cell such as multi-user throughput or aggregations of these in order to improve cell performance.

In some implementations, an estimation process involving CSI can be used to modify a machine-learning network. For example, certain channel characteristics or other data can be associated or be used to determine specific channel characteristics and resulting weights or a profile of one or more weights to be applied to a machine-learning network. In some cases, computation can involve pre-coding weights for downlink transmission based on the uplink CSI estimation process.

In some implementations, machine-learning network can be used side by side with conventional MMSE approaches. For example, performance analysis including EVM, BER, and FER can be computed for UE or DL receivers and the gNB or UL receiver. In tests based on comparing equalization and estimation processes, it can be shown that machine-learning network approaches offer improvement over currently used algorithmic approaches. In this case, the machine-learning approach can be applied widely to both UE and gNB receiver and pre-coding calculation schemes within modern 4G, 5G, 5G+ and similar WIFI systems which utilize many antennas and seek to optimize efficiently across many antenna path and multi-user degrees of freedom and reduce computational complexity.

FIG. 6 is a diagram showing a front-haul scenario of a communications system 600. Item 620 is an example of stages correlated to the above system 600. The example of FIG. 6 shows a typical front-haul scenario for a 4G or 5G-NR system, where the High-PHY or upper-PHY run on the two digital units (DU)s shown, first DU 604 and second DU 606. Sometimes, DU can be a form of a baseband unit (BBU). In the example of FIG. 6, the option 7-2 split is used to split the plurality of Radio Unit (RUs) shown in items 610, 612, 614, and 616 from the two DUs 604 and 606. The plurality of RUs shown in items 610, 612, 614, and 616 process components of the Low-PHY as shown in item 620. The split between the DUs and RUs as shown in FIG. 6 is an example of a front-haul split. In this case, where the DU performs High-PHY processing for a number of sectors, the more efficient a DU's computation is, the more sectors it can support, the less hardware, correlated with capital expenditures, and less power, correlated with operation expenditures, the system 600 has to use to maintain itself.

In the example of FIG. 6, the system 600 includes a centralized unit (CU) 602 communicably connected to two DUs 604 and 606. As shown in item 620, the CU 602 can supply the DUs 604 and 606 with a MAC as described in the processes of FIG. 5. In this example, the DUs 604 and 606 include a machine-learning network 605. In this example, the machine-learning network 605 processes the estimation, interpolation, and equalization processes from a received RF signal. In some implementations, the machine-learning network 605 is similar to the machine-learning network 120 described with respect to the system 100, or the machine-learning network 212 described with respect to the system 200.

The DUs 604 and 606, use the machine-learning network 605 to replace portions of the High-PHY. As mentioned previously, a machine-learning network such as the machine-learning network 605 may instead augment portions of the High-PHY responsive to commands received by the DUs, data obtained by an element communicably connected to the DU, or the DU itself. The DU functions in the example of system 600 include estimation, interpolation, and equalization. By using the machine-learning network 605 which allows for more efficient processing of more antennas, reducing computational complexity and improving signal quality and UE density, the two DUs 604 and 606 can improve the functioning of the system 600 as compared to conventional approaches.

FIG. 6 attempts to illustrate the beneficial effect of using a machine-learning network such as the machine-learning network 605 within a system such as the system 600. The machine-learning network approach scales from small numbers of antennas, e.g., 1, 2, or 4, up to larger Massive MIMO systems, e.g., with 32, 64, 256 or more antennas Because the network complexity can generally scale linearly (or near linearly) with the number of elements, this can lead to drastic complexity improvements for larger numbers of elements which is currently a major problem with Linear MMSE or Linear Zero-Forcing approaches to estimation, equalization, and pre-coding matrix calculation today, where these linear matrix inversion algorithms scale with order $O(N^3)$ (where Nis an integer >0) or exponential complexity in many cases.

The conventional approach leads to high capital expenses for large numbers of compute per second hardware, and high operating expenses in terms of the Watts/second used to operate hardware as well as the cooling, battery backup, and other expenses such a system consumes. Architectures previously showed such as U-Net or similar convolutional architecture drastically reduce this complexity and allow for many antenna digital processing systems supporting SU and MU-MIMO systems in many antenna configurations supporting state of the art multi-user density and capacity alongside state-of-the-art energy efficiency and operating costs.

In some implementations, transmission configuration values may be provided as input to a machine-learning network. For example, transmission configuration such as the modulation and coding information (MCI) or similar information may be provided as input to a machine-learning network or various portions of the machine-learning network. This information can be used to facilitate learning how estimation or decoding decides on symbols or bits given multiple possible symbol encodings. For example, a machine-learning network may be able to decode using a variety of symbol encodings including QPSK, 16 quadrature amplitude modulation (QAM), 64QAM, 256QAM. In general, the approach defined in this specification can be applied to any system and any corresponding symbol encoding.

In some implementations, a machine-learning network approach can be deployed within a variety of systems. Example deployment systems include 4G, 5G, and beyond 5G Baseband Unit (BBU) within a distributed unit (DU) especially within vBBU and O-Ran, 7-2 split front haul configurations. The DU can provide the L1 signal processing among other things, often between the Remote Radio Head (RRH) or Radio Unit (RU) which includes radio hardware and sometimes low level L1 processing, and the centralized unit (CU), which can provide upper layer network functions and sometimes includes functions of L2 and L3 processing. The machine-learning network approach can also be deployed within user equipment(s) (UE), for instance where ML can be used within the baseband processing and modem on mobile units where it may also reduce power consumption and complexity, improve signal fidelity under harsh conditions, and better enable processing of many antenna elements. It can be used in either O-RAN BBU, DU software, or firmware implementations. It can also be used in major equipment provider (e.g., Ericsson, Nokia, Huawei, among others) DU implementations which may be integrated in a more end-to-end manner which may not be O-Ran or vRAN or front-haul compliant but implements similar PHY functionality.

In some implementations, not only the received unequalized resource grid but an additional resource grid alongside a pilot resource grid can be provided as input to a machine-learning network. For example, a machine-learning network can receive and use both an unequalized resource grid and an additional resource grid alongside a pilot resource grid to better recover the channel estimates and equalized symbol values using both sets of information.

FIG. 7 is a diagram illustrating an example of a computing system used for processing digital communications using a machine-learning network. The computing system includes computing device 700 and a mobile computing device 750 that can be used to implement the techniques described herein. For example, one or more components of the system 100 could be an example of the computing device 700 or the mobile computing device 750, such as a computer system implementing the machine-learning network 120, devices that access information from the machine-learning network 120, or a server that accesses or stores information regarding the operations performed by the machine-learning network 120. As another example, one or more components of the system 200 could be an example of the computing device 700 or the mobile computing device 750, such as device 201 or device 208 implementing the machine-learning network 212, devices that access information from the machine-learning network 212, or a server that accesses or stores information regarding the operations performed by the machine-learning network 212.

The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 702 is a single threaded processor. In some implementations, the processor 702 is a multi-threaded processor. In some implementations, the processor 702 is a quantum computer.

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine readable mediums (for example, the memory 704, the storage device 706, or memory on the processor 702). The high-speed interface 708 manages bandwidth-intensive operations for the computing device 700, while the low-speed interface 712 manages lower bandwidth-intensive operations. Such allocation of functions is an example only. In some implementations, the high speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device, such as a mobile computing device 750. Each of such devices may include one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (nonvolatile random access memory), as discussed below. In some implementations, instructions are stored in an information carrier such that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry in some cases. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 768 using a radio frequency. In addition, short-range communication may occur, such as using a Bluetooth, Wi-Fi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, among others) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

In some implementations, a communications system described in this disclosure, e.g., system 100 or the system 200, or both, uses fully-convolutional or partially convolutional architectures to improve performance. For example, the communications system uses U-Net architecture in some cases. Other cases use alternative architectures such as similar classes of fully-convolutional networks. The fully-convolutional or partially convolutional architectures enable the system to learn faster (for example, less time and examples used), use less parameters, or generalize better (for example, less likely to over-fit to data). Such implementations lead to lower computational complexity.

In some implementations, the system uses a time step architecture that considers a sequence model over multiple steps or slots in time to model the evolution of the communications channel, e.g., communications channel 207. Depending on the channel coherence time, this can help improve averaging, convergence, as well as estimation accuracy for channel information. However, interpolation across pilots can use additional effort.

Some implementations can include a Weiner filter, Sinc Interpolation, among others. In some cases, these implementations do not require domain knowledge such as what a fade looks like in a communications channel or how frame layout and pilot spacing effects interpolation of channel estimates.

By learning interpolation within the estimation and equalization processes (e.g., estimating the communications channel directly from a sparse set of pilots, effectively using both pilot-directed sparse estimates and non-pilot directed information learned by the network, and interpolating effectively across the entire resource block (RB) allocation in a learned, domain specific, and contextually aware way) an approach leveraging a machine-learning network within a communications system can improve performance. Learning interpolation within the estimation and equalization processes enables learning domain-specific interpolation schemes which can offer improved interpolation between sparse points of information. Domain-specific interpolation schemes could also be used independently in some instances. For example, a machine-learning network can be used only for the interpolation phase in some cases within the context of estimation and equalization routines. In other implementations, a machine-learning network can similarly take a portion of the processing within a communications system. For example, a machine-learning network can process only the estimation processes.

In some implementations, pre-training is not performed on a machine-learning network within a communications system. For example, a machine-leaning network, such as the machine-learning network 212 in the system 200, may be deployed without first being trained. In some cases, training from scratch by deploying a machine-learning network without any training may be beneficial. For example, in situations with very difficult or unique channel conditions, starting training with the actual channel conditions and not pre-training conditions may result in better results from the machine-learning network.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method to process a received communication signal using at least one machine-learning network, the method comprising:

obtaining, at a first device, a received communication signal that includes data information, wherein one or more elements of the data information each correspond to a particular time and a particular frequency in a time-frequency spectrum, the received communication signal corresponding to a transmitted communication signal having been modified by transmission over a communications channel, the transmitted communication signal generated by a second device that is communicably coupled to the first device;

generating, by the first device, data extracted from the received communication signal, the extracted data corresponds to both time and frequency in the time-frequency spectrum;

processing, by the first device, the data extracted from the received communication signal using a machine-learning network that is trained to process communication signals;

in response to processing the data extracted from the received communication signal using the machine-learning network, obtaining, by the first device from the machine-learning network, an output result corresponding to the data extracted from the received communication signal, wherein the output result represents at least one of (i) an estimate of the communications channel communicably connecting the first device and the second device or (ii) an estimate of symbols transmitted in the received communication signal transmitted through the communications channel; and updating, by the first device, the machine-learning network based on the output result and the received communication signal.

2. The method of claim 1, wherein the received communication signal includes one or more of a physical uplink shared channel (PUSCH) or physical downlink shared channel (PDSCH).

3. The method of claim 1, wherein the first device includes multiple antennas or receives signals simultaneously from two or more users.

4. The method of claim 1, wherein the first device includes a baseband unit and radio unit, wherein the baseband unit performs one or more operations of high-PHY processing and the radio unit performs one or more operations of low-PHY processing.

5. The method of claim 4, wherein the radio unit of the first device performs analog-to-digital conversion of the received communication signal.

6. The method of claim 4, wherein the machine-learning network is deployed in the baseband unit of the first device.

7. The method of claim 4, wherein the machine-learning network is deployed in the radio unit of the first device.

8. The method of claim 1, wherein the received communication signal includes one or more transmitted symbols represented by a combination of amplitude and phase variations and the first device compares the one or more transmitted symbols with one or more constellation points of a quadrature amplitude modulation (QAM) scheme.

9. The method of claim 1, comprising:
generating, using the received communication signal, ground truth data.

10. The method of claim 9, wherein generating, using the received communication signal, the ground truth data comprises:
generating, using reference signals of the received communication signal, the ground truth data.

11. The method of claim 9, wherein generating, using the received communication signal, the ground truth data comprises:
computing one or more of an error vector magnitude (EVM), bit error rate (BER), frame error rate (FER), code block error rate (BLER), or soft log-likelihood (LLR) error.

12. The method of claim 9, further comprising:
computing, by the first device, an error term by comparing the output result and the generated ground truth data; and
updating, by the first device, the machine-learning network based on the error term.

13. The method of claim 12, wherein the generated ground truth data include values of one or more of:
equalized data symbols, bit values or soft log-likelihood (LLR) values, channel estimates determined from one or more of a process of generating the data information, a decision feedback process, or pilot subcarriers, or an out-of-band communication.

14. The method of claim 12, wherein updating the machine-learning network based on the error term comprises:
determining, based on a loss function, a rate of change of values of one or more weights in the machine-learning network; and
performing an optimization process using the rate of change to update the values of the one or more weights in the machine-learning network.

15. The method of claim 14, wherein the optimization process comprises one or more of gradient descent, stochastic gradient descent (SGD), or forms of gradient descent with additional optimization terms,
wherein the forms of gradient descent with additional optimization terms include one or more of Adaptive Moment Estimation (Adam), rectified Adam (RAdam), weight decay Adam (AdamW), or Lookahead neural network optimization.

16. The method of claim 14, wherein the optimization process involves minimizing a loss value between predicted and actual values of subcarriers, bits, soft log-likelihood (LLR) values, or channel responses.

17. The method of claim 1, wherein the machine-learning network performs operations corresponding to one or more of estimation, interpolation, equalization of pilot symbols, or equalization of data symbols.

18. The method of claim 1, wherein the machine-learning network is at least partially trained prior to processing the extracted data.

19. The method of claim 1, wherein the machine-learning network is partially trained by transmitting a second data signal that includes second data information.

20. The method of claim 1, comprising:
training the machine-learning network using one or more simulated communications channel including one or more of an Additive White Gaussian Noise (AWGN) or Rayleigh fading channel model, International Telecommunication Union (ITU) or $3^{rd}$ Generation Partnership Project (3GPP) fading channel models, statistical channel models, time-delay line (TDL) models, emulated radio emissions, propagation models, ray tracing within simulated geometry or an environment to produce channel effects, or a second machine-learning network trained to approximate measurements over a real channel.

21. The method of claim 1, wherein the output result obtained from the machine-learning network is one of a channel response of the communications channel, an inverse channel response of the communications channel, values of the data information prior to modification by transmission over the communications channel, or bit or log-likelihood bit values of bits encoded by symbols over the communications channel.

22. The method of claim 1, wherein the machine-learning network includes at least one of a convolutional layer or a fully connected layer.

23. The method of claim 1, wherein the data information corresponds to data information modulated by the second device using a modulator corresponding to an orthogonal frequency-division multiplexing (OFDM) system.

24. The method of claim 23, wherein the OFDM system includes one or more elements of cyclic-prefix orthogonal frequency division multiplexing (CP-OFDM), single carrier frequency division multiplexing (SCFDM), filter bank multicarrier (FBMC), Discrete Fourier Transform-spread-OFDM (DFT-s-OFDM), or elements of other variants of OFDM.

25. The method of claim 1, wherein the output result includes a prediction by the machine-learning network corresponding to the received communication signal transmitted through the communications channel.

26. The method of claim 1, wherein generating the extracted data based at least on the received communication signal comprises:
generating a set of one or more subcarriers based at least on the received communication signal.

27. The method of claim 1, wherein processing the data extracted from the received communication signal using the machine-learning network that is trained to process communication signals comprises:
processing the data extracted from the received communication signal using the machine-learning network that is trained to estimate at least one of (i) the communications channel or (ii) symbols transmitted through the communications channel.

28. A non-transitory computer-readable medium storing one or more instructions executable by a computer system to perform operations comprising:
obtaining, at a first device, a received communication signal that includes data information, wherein one or more elements of the data information each correspond to a particular time and a particular frequency in a time-frequency spectrum, the received communication signal corresponding to a transmitted communication signal having been modified by transmission over a communications channel, the transmitted communication signal generated by a second device that is communicably coupled to the first device;
generating, by the first device, data extracted from the received communication signal, the extracted data corresponds to both time and frequency in the time-frequency spectrum;
processing, by the first device, the data extracted from the received communication signal using a machine-learning network that is trained to process communication signals;
in response to processing the data extracted from the received communication signal using the machine-learning network, obtaining, by the first device from the machine-learning network, an output result corresponding to the data extracted from the received communication signal, wherein the output result represents at least one of (i) an estimate of the communications channel communicably connecting the first device and the second device or (ii) an estimate of symbols transmitted in the received communication signal transmitted through the communications channel; and updating, by the first device, the machine-learning network based on the output result and the received communication signal.

29. A system, comprising:

one or more processors; and machine-readable media interoperably coupled with the one or more processors and storing one or more instructions that, when executed, cause the one or more processors to perform operations comprising:

obtaining, at a first device, a received communication signal that includes data information, wherein one or more elements of the data information each correspond to a particular time and a particular frequency in a time-frequency spectrum, the received communication signal corresponding to a transmitted communication signal having been modified by transmission over a communications channel, the transmitted communication signal generated by a second device that is communicably coupled to the first device;

generating, by the first device, data extracted from the received communication signal, the extracted data corresponds to both time and frequency in the time-frequency spectrum;

processing, by the first device, the data extracted from the received communication signal using a machine-learning network that is trained to process communication signals;

in response to processing the data extracted from the received communication signal using the machine-learning network, obtaining, by the first device from the machine-learning network, an output result corresponding to the data extracted from the received communication signal, wherein the output result represents at least one of (i) an estimate of the communications channel communicably connecting the first device and the second device or (ii) an estimate of symbols transmitted in the received communication signal transmitted through the communications channel; and updating, by the first device, the machine-learning network based on the output result and the received communication signal.

* * * * *